United States Patent
Reed et al.

(10) Patent No.: US 6,402,618 B1
(45) Date of Patent: Jun. 11, 2002

(54) COMPUTER SOFTWARE DELIVERY SYSTEM

(75) Inventors: Michael J. Reed; Michael F. Lavery, both of Austin, TX (US)

(73) Assignees: Time Warner Entertainment Co. LP, New York, NY (US); TCI Technology Management, LLC, Englewood, CO (US)

( * ) Notice: Subject to any disclaimer, the term of this patent is extended or adjusted under 35 U.S.C. 154(b) by 0 days.

(21) Appl. No.: 09/621,678

(22) Filed: Jul. 24, 2000

Related U.S. Application Data

(63) Continuation of application No. 09/352,371, filed on Jul. 13, 1999, now Pat. No. 6,126,546, which is a division of application No. 08/671,817, filed on Jun. 25, 1996, now Pat. No. 5,944,608, which is a division of application No. 08/132,464, filed on Oct. 6, 1993, now Pat. No. 5,577,735, which is a continuation of application No. 07/706,222, filed on May 28, 1991, now Pat. No. 5,251,909.

(51) Int. Cl.[7] ............................................. A63F 13/00
(52) U.S. Cl. ........................... 463/40; 463/25; 700/93
(58) Field of Search ...................... 413/40; 700/91–93; 348/6; 725/141

(56) References Cited

U.S. PATENT DOCUMENTS

| | | |
|---|---|---|
| 3,488,445 A | 1/1970 | Chang |
| 3,546,791 A | 12/1970 | Koos et al. |
| 3,993,861 A | 11/1976 | Baer |
| 4,040,034 A | 8/1977 | Belady et al. |
| 4,054,911 A | 10/1977 | Fletcher et al. |

(List continued on next page.)

FOREIGN PATENT DOCUMENTS

| | | |
|---|---|---|
| DE | 4141766 | 6/1993 |
| EP | 0206821 | 12/1986 |
| EP | 0228634 | 7/1987 |
| EP | 0277014 | 1/1988 |
| EP | 0306208 | 3/1989 |

(List continued on next page.)

OTHER PUBLICATIONS

"Downloading & Teledelivery of Computer Software, Games, Music & Video," International Resource Development Inc., Report #558, Jul. 1983.

"Receiving Telesoftware with CCT," J. R. Kinghorn, *International Conference On Telesoftware*, Sep. 27–28, 1984, pp. 9–14.

"GI, Mattel venture to Offer TV Game/Home Computer," David Brousell, *Electronic News*, May 28, 1979, p. 13S.

"PlayCable give subscribers videogames sans cartridge," *Merchandising*, Jan. 1982, p. 79.

(List continued on next page.)

*Primary Examiner*—Jessica Harrison
*Assistant Examiner*—John M. Hotaling, II
(74) *Attorney, Agent, or Firm*—Baker Botts LLP

(57) ABSTRACT

Apparatus and method for sending and receiving subscriber video game computer data over a broadcast medium for use with video game players and which includes microprocessor controlled transmitter and receiver systems. The receiver system retrieves, demodulates, screens and selects computer data according to subscriber input. A receiver microprocessor signals a video game player to choose from a selection of games placed into a memory. The receiver microprocessor regains control of the memory and regulates flow of selected computer data to the memory. After checking for authorized use, the receiver microprocessor allows control of memory containing video game code to transfer to the video game player. The transmitter system stores, codes, and transmits the computer data over a public broadcast system.

31 Claims, 19 Drawing Sheets

U.S. PATENT DOCUMENTS

| | | |
|---|---|---|
| 4,115,662 A | 9/1978 | Gainet et al. |
| 4,205,343 A | 5/1980 | Barrett |
| 4,247,106 A | 1/1981 | Jeffers et al. |
| 4,264,924 A | 4/1981 | Freeman |
| 4,385,381 A | 5/1983 | Alexis |
| 4,438,511 A | 3/1984 | Baran |
| 4,455,619 A | 6/1984 | Masui et al. |
| 4,572,509 A | 2/1986 | Sitrick |
| 4,592,546 A | 6/1986 | Fascenda et al. |
| 4,593,376 A | 6/1986 | Volk |
| 4,597,058 A | 6/1986 | Izumi et al. |
| 4,601,045 A | 7/1986 | Lubarsky |
| 4,625,235 A | 11/1986 | Watson |
| 4,658,093 A | 4/1987 | Hellman |
| 4,677,434 A | 6/1987 | Fascenda |
| 4,688,169 A | 8/1987 | Joshi |
| 4,745,468 A | 5/1988 | Kohorn |
| 4,823,385 A | 4/1989 | Hegendorfer |
| 4,876,592 A | 10/1989 | Kohorn |
| 4,882,674 A | 11/1989 | Quint et al. |
| 4,890,320 A | 12/1989 | Monslow et al. |
| 4,894,789 A | 1/1990 | Yee |
| 4,905,280 A | 2/1990 | Wiedemer |
| 4,922,420 A | 5/1990 | Nakagawa et al. |
| 4,922,522 A | 5/1990 | Scanlon |
| 4,926,255 A | 5/1990 | Kohorn |
| 4,959,783 A | 9/1990 | Scott et al. |
| 4,999,806 A | 3/1991 | Chernow et al. |
| 5,003,384 A | 3/1991 | Durden et al. |
| 5,027,395 A | 6/1991 | Anderson et al. |
| 5,034,807 A | 7/1991 | Kohorn |
| 5,051,822 A | 9/1991 | Rhoades |
| 5,057,915 A | 10/1991 | Kohorn |
| 5,069,453 A | 12/1991 | Koza et al. |
| 5,083,272 A | 1/1992 | Walker et al. |
| 5,128,752 A | 7/1992 | Kohorn |
| 5,144,663 A | 9/1992 | Kudelski et al. |
| 5,166,886 A | 11/1992 | Molnar et al. |
| 5,227,874 A | 7/1993 | Kohorn |
| 5,249,044 A | 9/1993 | Kohorn |
| 5,251,909 A | 10/1993 | Reed et al. |
| 5,283,734 A | 2/1994 | Kohorn |
| 5,440,730 A | 8/1995 | Elmasri et al. |

FOREIGN PATENT DOCUMENTS

| | | |
|---|---|---|
| EP | 0421060 | 4/1991 |
| EP | 0473507 | 8/1991 |
| EP | 0447043 | 9/1991 |
| EP | 0481770 | 4/1992 |
| EP | 0484806 | 5/1992 |
| EP | 0491068 | 6/1992 |
| EP | 0513925 | 11/1992 |
| GB | 1287304 | 8/1972 |
| GB | 1521722 | 8/1978 |
| GB | 2041707 | 9/1980 |
| GB | 2118750 | 11/1983 |
| GB | 2120507 | 11/1983 |
| GB | 2185670 | 7/1987 |
| GB | 2197770 | 5/1988 |
| JP | 55-130689 | 10/1980 |
| JP | 61049574 | 11/1986 |
| JP | 61-263380 | 11/1986 |
| JP | 62-286489 | 12/1987 |
| JP | 63-177893 | 7/1988 |
| WO | 8002961 | 10/1981 |
| WO | 8502082 | 5/1985 |
| WO | 8502310 | 5/1985 |
| WO | 9013865 | 11/1990 |
| WO | 9104618 | 4/1991 |
| WO | 9105436 | 4/1991 |
| WO | 9106160 | 5/1991 |
| WO | 9300774 | 1/1993 |
| WO | 9305593 | 3/1993 |

OTHER PUBLICATIONS

"Games over the cable," *Financial Times* (London), Sep. 5, 1979, p. 13.

"Mattel plays game on cable tv test," *Advertising Age*, Jul. 12, 1982, p. 76.

"Videogame service to get cable tv test", *Advertising Age*, Jul. 12, 1982 p. 76.

"Cable–TV System to Enable Viewers to Play Games," *New York Times*, May 19, 1979, p. 48.

"Video Games Invading Cable TV, But So Far Without Much Success," Laura Landro, *Wall Street Journal*, Mar. 14, 1983, p. 33.

Conference "Electronic Delivery of Data and Software," The Institution of Electronic and Radio Engineers (Sep. 1986).

"Satellite software distribution looms on the horizon," Stephen J. Shaw, *Mini–Micro Systems*, Jul. 1984, pp. 62, 67, 68, 70.

"Development of data broadcasting systems and services towards the 21st century," A. Yanagimachi and S. Harada, *Telecommunication Journal*, vol. 57, Apr. 1990, pp. 245–254.

"Telesoftware: adding intelligence to teletext," J.Hedger and R. Eason, *Proceedings of the Institution of electrical engineers*, vol. 126, No. 12, Dec. 1979, pp. 1412–1416.

"The Application of Digital Broadcast Communication to Large Scale Information Systems," David K. Gifford, John M. Lucassen, Stephen T. Berlin, *IEEE Journal On Selected Areas In Communications*, vol. SAC–3, No. 3, May 1985, pp. 457–467.

"Telesoftware: Home Computing Via Broadcast Teletext," J. Hedger, *IEEE Transactions on Consumer Electronics*, vol. CE–25, No. 3, Jul. 1979, pp. 279–287.

"Datacast: The Transmission System," J.P. Chambers, *BBC Research Department Report*, No. 1, Mar. 1988.

"Conditional Access Broadcasting Datacare 2: An Over–Air Enabled System or General Data Channels", D. T. Wright, *BBC Research Department Report*, No. 10, Aug. 1988.

"Telesoftware: Value Added Teletext," J. Hedger, A. Warburton, *IEEE Transactions on Consumer Electronics*, vol. CE–26, Aug. 1989, pp. 555–566.

"VPU, The multimode teletext encoder," L.Kool and R. Slagter, *Philips Telecommunication & Data Systems Review*, vol. 44, No. 2, Oct. 1986, pp. 30–37.

"Tune In Software (On Your FM Radio)," Tom R. Halfill, *Compute Journal For Progressive Computing*, vol. 4, No. 10, Oct. 1982, pp. 38–42.

"The UK Teletext Standard for Telesoftware Transmissions," D.J. Rayers, *International Conference on Telesoftware*, Sep. 27–28, 1984, pp. 1–8.

"Games Telesoftware on Cable," T. J. Havelock, *International Conference On Telesoftware*, Sep. 27–28, 1984, pp. 55–58.

"The Development of a Commercial Telesoftware Service," A. Sweet, *International Conference on Telesoftware*, Sep. 27–28, 1984, pp. 71–74.

DATA PACKET FORMAT

COMMAND PACKET FORMAT

COMPUTER SOFTWARE DELIVERY SYSTEM

This application is a continuation of U.S. patent application Ser. No. 09/352,371, filed on Jul. 13, 1999 now issued as U.S. Pat. No. 6,126,546 ; which is a divisional of U.S. patent application Ser. No. 08/671,817, filed on Jun. 25, 1996 now issued as U.S. Pat. No. 5,944,608; which is a divisional of U.S. patent application Ser. No. 08/132,464, filed on Oct. 6, 1993, now issued as U.S. Pat. No. 5,577,735; which is a continuation of U.S. patent application Ser. No. 07/706,222, filed on May 28, 1991, now issued as U.S. Pat. No. 5,251,909.

BACKGROUND OF THE INVENTION

1. Field of the Invention

The present invention relates generally to apparatus and method for providing subscriber computer data via public communication systems and, more particularly is concerned with transmitting and receiving subscriber video game computer data for use with video game players.

2. Description of the Background

In the last decade, many consumers have developed a great interest in the latest video games for use with home application computers and for dedicated computers such as video game players.

While home application computers often have modems through which video games can be received over telephone lines, albeit at a relatively low rate of data transmission speed, popular video game players are restricted to buying or renting video game cartridges. Generally the only method of changing out video games on popular video game players involves replacement of the relatively expensive game cartridge.

Due to the substantial cost to rent or purchase these video game cartridges, the available selection of video games a person may have is generally rather limited with respect to the latest video games that may be available.

Consequently, a need exists for improvements in efficiencies concerning video game computer data so that a relatively wide assortment of recent video games may be available for a more modest price.

SUMMARY OF THE INVENTION

The present invention provides apparatus and method for allowing access to a substantial number of new video games on a video game player through its game cartridge connection in a manner designed to be economically feasible for the various interested parties. The video games are generally broadcast, in a preferred embodiment over a CATV system and can be selected and played by use of a retrieval and storage device. A similar embodiment of the preferred invention could be used to provide faster data transmission of video games, sports news, business information, etc. for home application computers than is available over the telephone line.

It is to be understood that a video game player is a microprocessor controlled device generally dedicated, but not necessarily restricted to, playing video games. Such a device typically has no keyboard for inputting information such as the keyboard normally associated with computers that is generally arranged in manner similar to that of a standard typewriter. Instead, a video game player generally uses input devices such as joysticks although there is substantial variety in the shape and arrangement of the joysticks. For instance, some games have a mat which serves the same purpose as the joysticks and has buttons within the mat which are used to input information. Typically video game players have a built in TV adaptor so that a standard television can be used instead of a monitor. Also video game players often have a connector in which a video game cartridge may be inserted. These game cartridges are available commercially and designed to fit into the video game cartridge connector.

A preferred embodiment of the present invention would include a transmitter for broadcasting the video games continually and repetitively over a CATV system although the broadcast could beads through an antenna or via telephone. Approximately thirty-two games could be broadcast in a preferred embodiment of the present invention. Such an embodiment would allow updating the CATV transmitter via the phone through a modem to avoid the need for an operator. Also updating could be achieved by exchanging a compact disc or other readily available means on a monthly or bi-monthly schedule. To prevent unauthorized use, the data could be encrypted. Other methods to prevent unauthorized use of computer data could also be used such as real time checks to prevent taping and reusing the information at a later time. Additionally, protection devices designed for general use by video game makers such as NINTENDO™ could be built into the receiver. Compression software would also prevent unauthorized use and increase the speed of transmission since few bytes would need to be transmitted.

The receiver would typically include at least one storage medium, usually but not necessarily in semi-conductor form, for storing the video game to be played. A preferred embodiment apparatus for use with a video game player would have an interface cable with a connector designed to attach to the game cartridge connection. Upon turning on the video game player, a menu may be displayed of games from which the subscriber could choose. After the subscriber makes his selection, the appropriate video game would, in a preferred embodiment, be uploaded typically over a CATV coaxial cable and stored in the storage medium. The video game player machine could preferably access the storage medium in the same way that it normally would access a standard game cartridge so that the subscriber, after selection of the video game, would not be able to detect any difference in operation. This will generally mean that the data, address, and control busses of the video game player will be connected, usually through gates, to the storage medium in such a manner that the receiver becomes essentially electronically invisible to the operation of the video game player. In a preferred embodiment, the apparatus would control access to the computer data placed into the storage medium by controlling the gating circuitry through which the host computer, or game player, busses are connected to the storage medium.

Such a system would generally be desirable for CATV broadcasters because consumer interest in video games would possibly greatly increase consumer motivation for acquiring a cable subscription or this new service, thus increasing revenues. The system, as stated previously, would provide safeguards against unauthorized use.

The system would have great interest to consumers who would be able to play a larger number of video games at, perhaps, a great reduction in price.

The system would also seem to have considerable economic appeal to video game player takers because of the increased demand that may occur for video game player devices. Also because of a possibly greatly expanded audience, video game software revenues may be substantially increased.

It is an object of the present invention to allow accessibility to new video games for video game players over a public communications system.

It is a feature of a preferred embodiment of the present invention that the interface connects directly to the game cartridge connector of a video game player.

It is an advantage of the present invention that the public would generally be able to have a wider selection of video games for video game players at a more modest cost.

DESCRIPTION OF THE PREFERRED EMBODIMENTS

Figure 1:
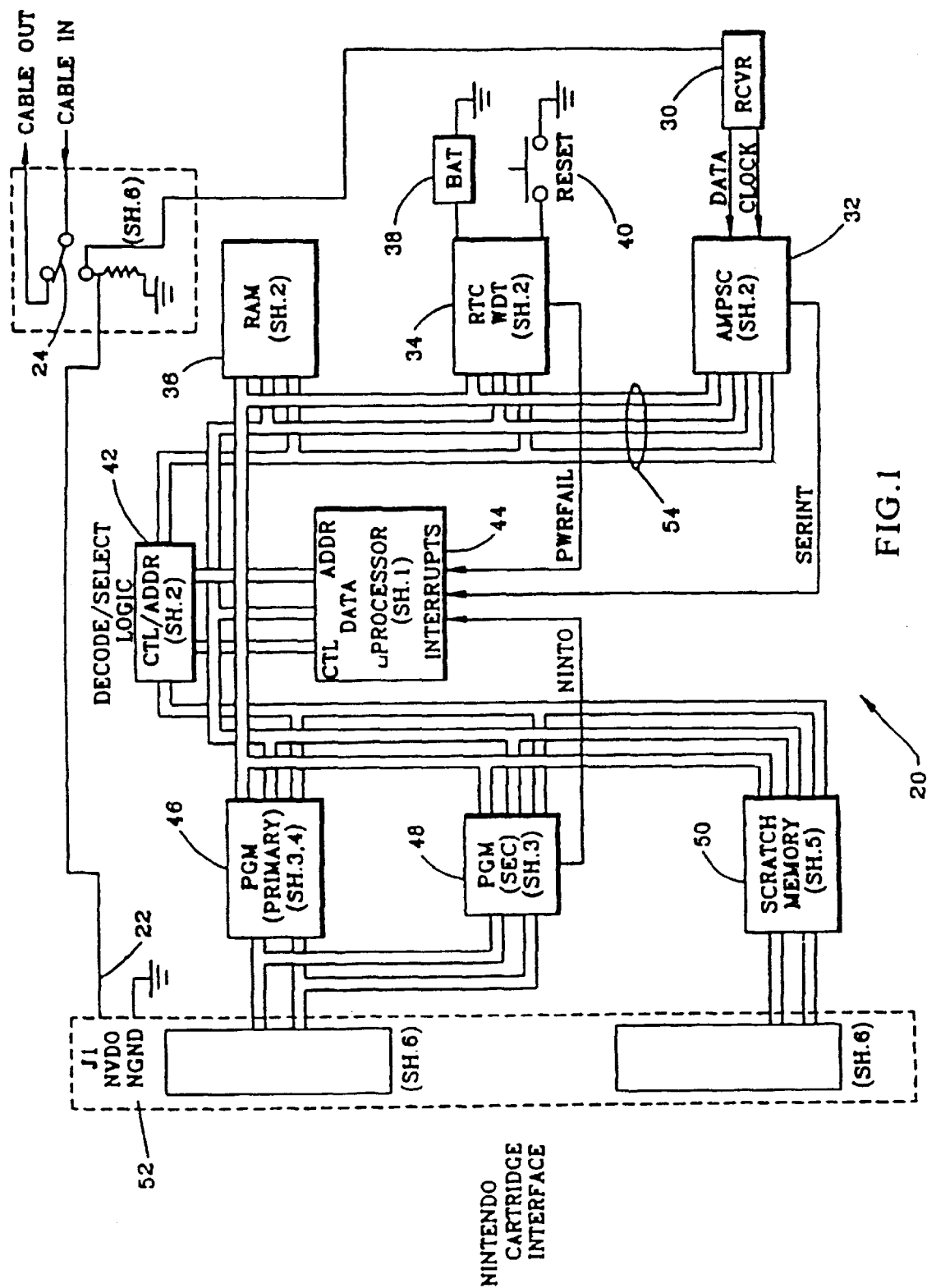
FIG. 1 is a block diagram schematic of a data receiver and storage device in accordance with the present invention.

Referring now to the drawings and more particularly FIG. 1, there is schematically shown apparatus, generally designated 20, for retrieving and storing computer data, according to a preferred embodiment of the present invention. The apparatus 20 includes receiver 30 for receiving and demodulating communication signals to retrieve computer data. Serial communication device 32 may be used to transfer this computer data to Random Access Memory (RAM) 36 over data, control, and address busses 54.

The computer data typically will contain real time clock information which can be checked against time values supplied from real time clock 34 which stays operational when power is removed due to battery 38. If the computer data is determined to be live, rather than taped, it may, after any necessary processing, be transferred to primary, secondary, or scratch pad memory 46,48, or 50.

Selection of the particular devices to have access to the data buss 150 or to be accessed is controlled by logic circuitry 42. Logic circuitry 42 also sends signals to the selected memory components to signal to them when to write or read data onto the data bus 150.

In a preferred embodiment, a coaxial cable from the subscriber drop of a CATV (Community Antenna Television) system is fed into relay 24. The FCC (Federal Communication Commission) generally defines a CATV system as any facility which receives, amplifies and distributes the signals broadcast by one or more television systems to fifty or more subscribers. A subscriber drop is generally a coaxial cable leading from [typically through a feeder cable tap] the trunk or main signal CATV transmission line to a CATV subscriber building. Reception of the necessary signals is also possible via radio broadcast systems as well as public broadcast systems incorporating CATV systems. Reception over public communication systems, such as telephone networks, is also feasible by use of the present invention having transmitter and receiver sections adapted for telephonic transmission and reception. For purposes of defining the present invention, public communication systems are presumed to include public broadcast systems as well as more private means of communication such as telephone networks.

In FIG. 1, if relay 24 is in its normally deactivated state, the subscriber drop coaxial cable passes directly through apparatus 20 although a signal splitter (not shown) or other device could be used so that it is not necessary for the cable signal to pass through apparatus 20. If a video game player is turned on, a power voltage from the video game player coming through connector 52 on line 22 is applied to activate relay 24 and connect the CATV signals to receiver 30. It is contemplated in an alternative preferred embodiment that cable relay 24 may be incorporated into a combined unit with receiver 30 along with Reset button 40. An additional system reset interrupt signal may be connected from such an anticipated unit to processor 44.

Apparatus 20 uses bus control logic 42 to gate bus lines from the NINTENDO™ Cartridge Interface for use of Primary Program memory 46 and Scratch memory 50 with control logic 42 being generally operated by microprocessor 44. This scheme allows, therefore, for the use of the memories by either a game player processor such as the NINTENDO™ processor or by microprocessor 44. Other methods of controlling the bus are possible. For instance, all processors could be connected directly to the bus and interrupts could determine which microprocessor would be active. A bus lock device could be used to prevent unauthorized use by jamming or holding bus signals fixed in some way. However, apparatus 20 provides for an excellent method of prevention of improper use of the bus by means of logic gates controlled ultimately by microprocessor 44.

Circuit diagrams showing the details of each of the block diagram components for apparatus 20 are illustrated in FIGS. 4–9.

Figure 3:
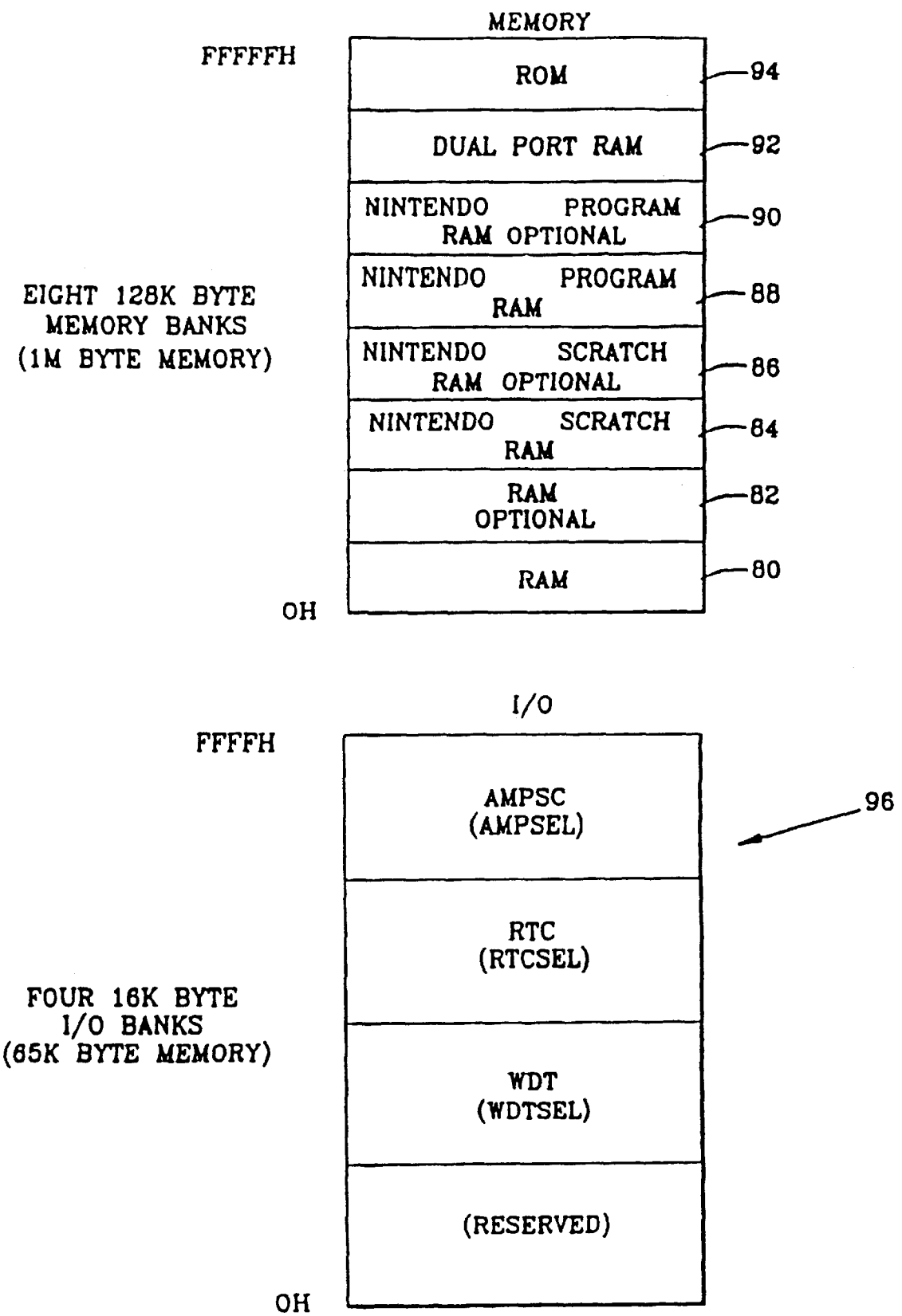
FIG. 3 is a block diagram of a microprocessor memory map for the data receiver and storage device in accordance with the present invention.
Figure 4:
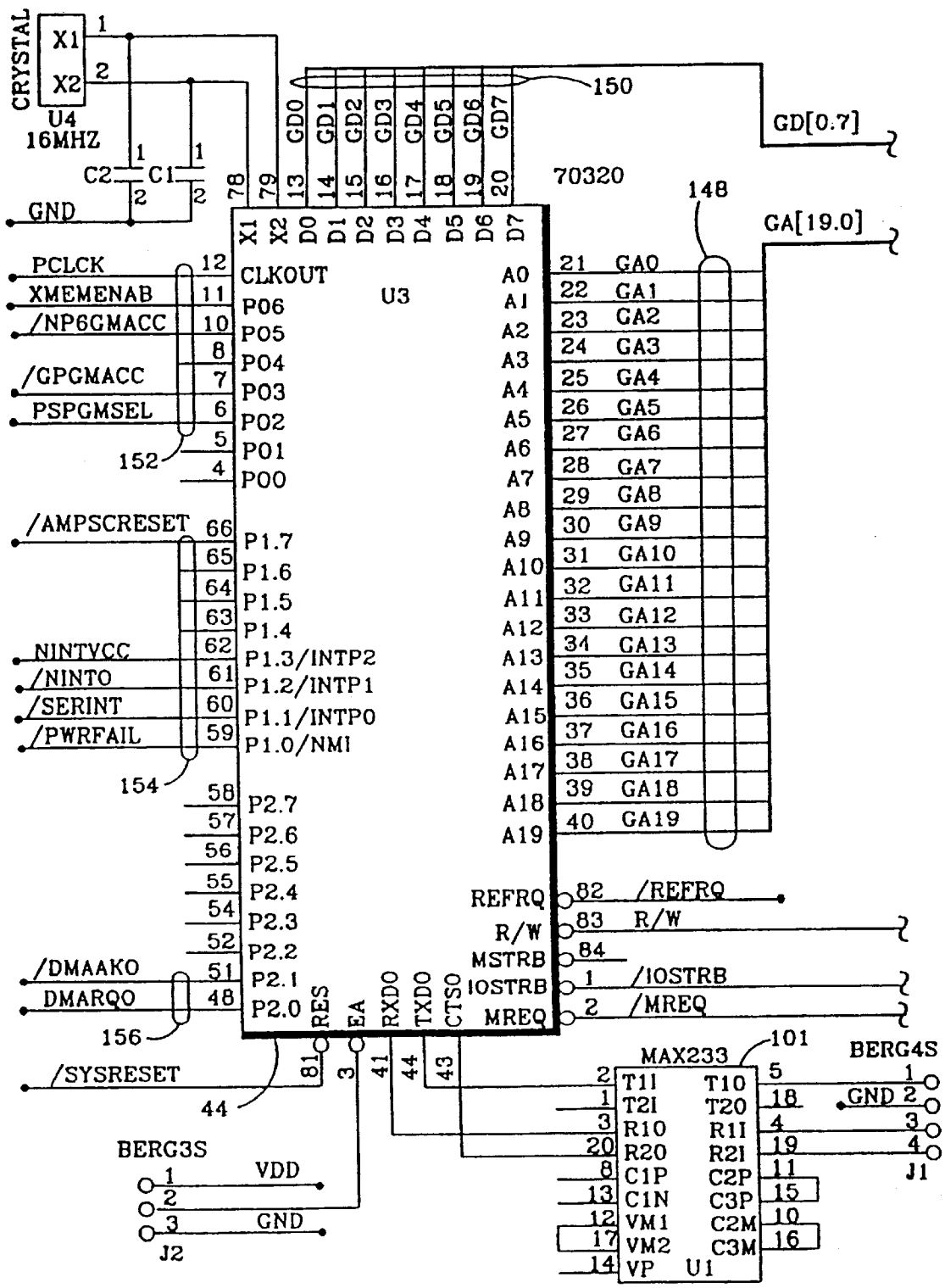
FIG. 4 is schematic of a microprocessor including busses for the data receiver and storage device in accordance with the present invention.
Figure 4A:
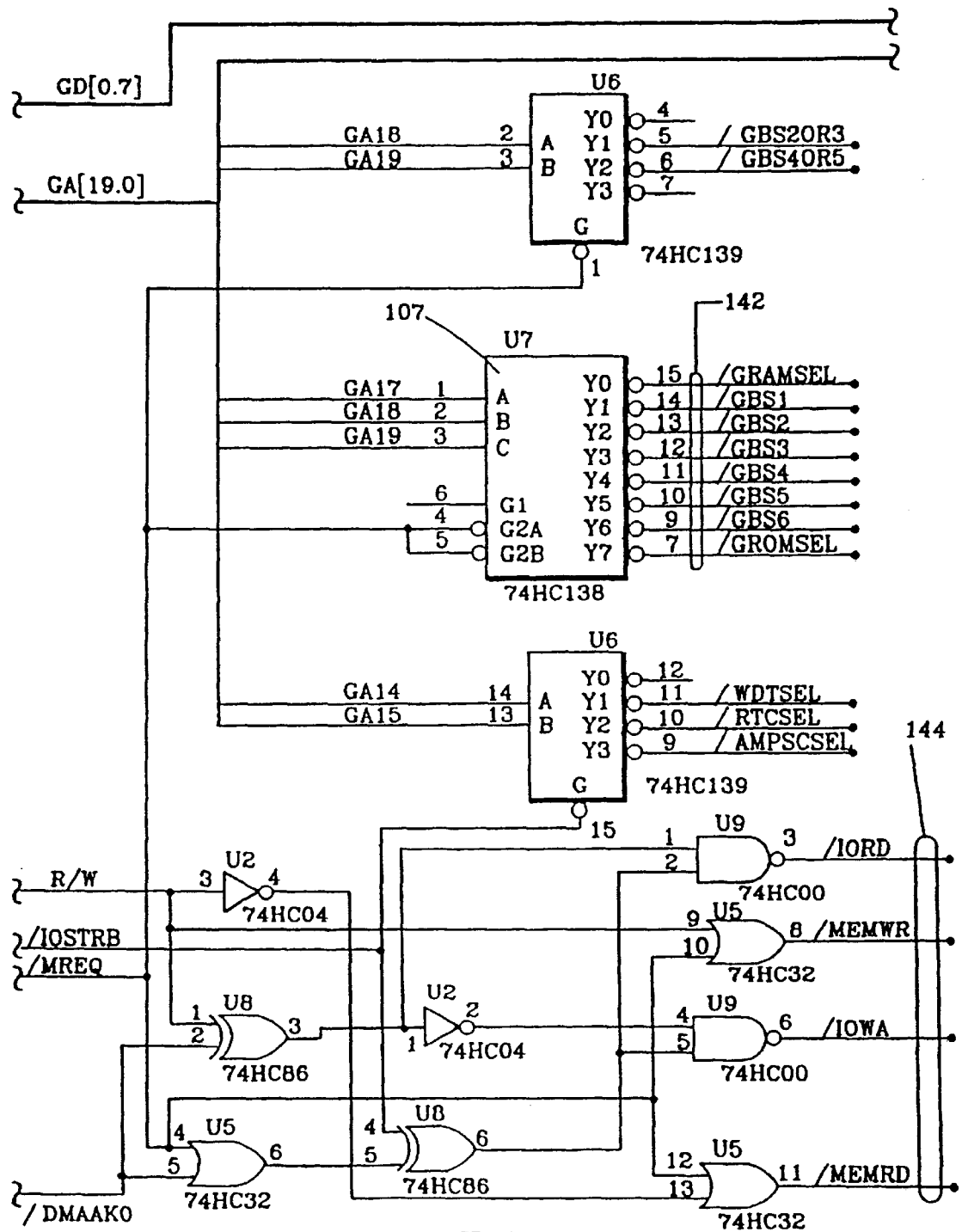
FIG. 4A is a schematic of microprocessor control circuitry for the data receiver and storage device in accordance with the present invention.

Referring now to FIGS. 3, 4 and 4A, many microprocessors or other processing circuits are available to implement the present invention although a NEC V25™ micro PD 70320 is used in a preferred embodiment as microprocessor 44. Use of a micro PD 70322, which additionally features on-board programmable Read only Memory (ROM), is anticipated to be used in the production product.

Address bus 148 is used to address the various memories within apparatus 20. For example, microprocessor 44 uses address lines 17, 18, and 19 (FIG. 4A) as well as a low signal on the memory request (MREQ) output to memory decoder 107, for individually selecting any one of the eight 128 KByte memory banks 80–94 (See FIG. 3) for read and write operations. A memory map, as shown in FIG. 3 for microprocessor 44, is generally an allocation of segments of a computer's primary storage that defines which areas the computer can use for specific purposes. Primary storage is generally defined as a computer's main memory which is directly accessible to a central processing unit. In this case, memory banks 80–94 form the primary storage for microprocessor 44.

Data bus 150 allows microprocessor 44 to retrieve and process computer data from serial communication device 32 (FIG. 1) as well as memory banks 80–94. As seen in FIG. 1, data bus 150 is connected to all eight memory banks 80–94 allowing transfer of data to and from memories within apparatus 20.

In a preferred embodiment, Port O uses lines 152 to apply the system clock to serial communication device 32 and control signals for allowing bus access by a NINTENDO™ video game player or other game player to program memory banks 88–92 and scratch pad memory bank 84. It is contemplated in an alternative preferred embodiment that presently unused Port O lines may be employed to provide additional control information generated by logic devices connected to NINTENDO™ address lines.

Port 1 uses lines 154 primarily as interrupts to signal microprocessor 44 that a specific event has occurred and that appropriate action should be taken. Port 2 employs lines 156 to provide DMA (Direct Memory Access) control for serial communication device 32 (FIG. 1) so that data may flow directly into memory without microprocessor 44 intervention, if so desired. An optional serial interface is provided in a preferred embodiment via component 101 to upload games, code, and configuration. It is also contemplated in an alternative preferred embodiment that device 101 may be removed and a special interface cable used to connect directly to receive signals RXDO, TXDO, and CTSO from microprocessor 44.

Part of logic circuitry 42 produces the control signals on signal lines 144 for use with memory components and serial controller 32. The signals produced by U6 are also used for I/O (input-output) decode signals within Ram 96 (FIG. 3). Although the general configuration of this part of logic circuitry 42 is illustrated in FIG. 4A, it is contemplated in an alternative preferred embodiment that most of this logic circuitry will be configured into a programmable array logic component or a so called Generic Array Logic™ component such as the GAL 16V8.

Figure 2:
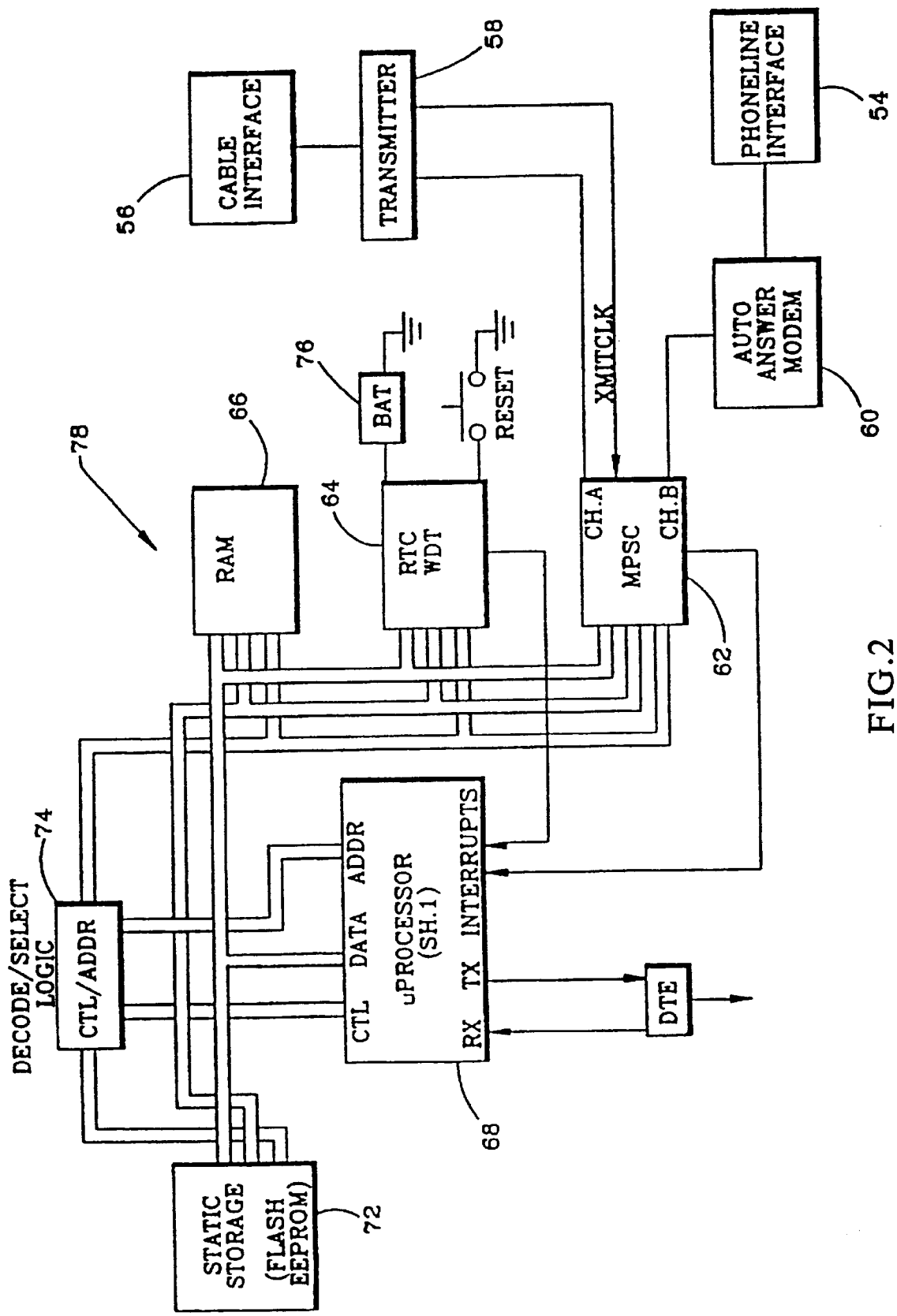
FIG. 2 is a block diagram schematic of a data transmitter in accordance with the present invention.
Figure 14:
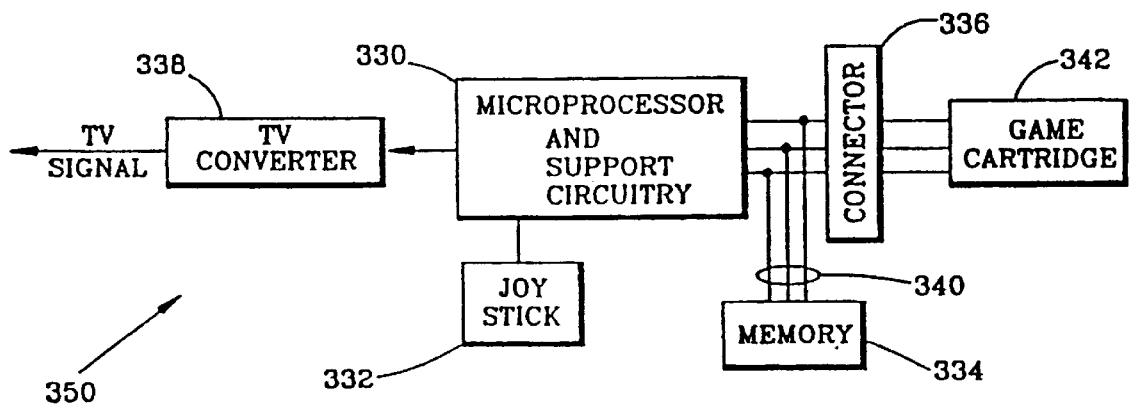
FIG. 14 is a block diagram schematic of a video game player showing internal busses connected to a video game cartridge connector.

A preferred embodiment software description for apparatus 20 is contained hereinafter although other embodiments could also be in accordance with the general spirit of the invention. Apparatus 20 is designed to be quite flexible so that a programmer will often have a number of options for achieving any particular task. Typically, to prevent unauthorized use, the received computer data is encrypted in a unusable format that must be decrypted into a useable format according to algorithms or decryption keys which may be located within the computer memory 114 (FIG. 5A) and which will match those used by transmitter apparatus 78 (FIG. 2). The microprocessor 44 is expected to be programed to check a time stamp in the computer data with the real time clock 34 (FIG. 1) and make a decision whether to allow the computer data to be used or not so as to avoid unauthorized access to video games as may perhaps be attempted using a video tape recorder. Menu information is expected to be sent to primary or scratch program memory 46 or 50 (FIG.1). The subscriber can choose which game to use typically by use of video game player joystick 332 (FIG. 14). Menu information is expected to remain in memory bank 92, 84, or other RAM bank so that it is not necessary to retrieve it again if a new game is desired. The transmitted data will, when necessary, include information concerning at which memory location the received computer data should be stored to obtain a proper sequence of data. According to the subscriber's choice of games, microprocessor 44 typically selects the proper block of computer data according to the particular data identification scheme used. A person skilled in the art will realize that a number of computer block identification possibilities exist and the particular method used to identify the appropriate computer data is not necessary for the understanding of the invention. However, for example only, each block may have a signal to indicate the beginning of a new block followed by an identification number. A revision number may be sent to prohibit a previously stored menu being used with an updated data stream. Some type of checking information, such as hash totaling, is expected to be used to determine that the data was received correctly. As well, instructions or address numbers will generally be sent to indicate the place in computer memory where the data is to be stored. The actual video game code is normally loaded into memory banks such as 84 and 88 (FIG. 3). Memory bank 84 can be used for game scores or other uses depending upon the video game program. Other programming goals and tasks will be explained or become obvious to one skilled in the art as the circuitry and operation of apparatus 20 is discussed.

Figure 5:
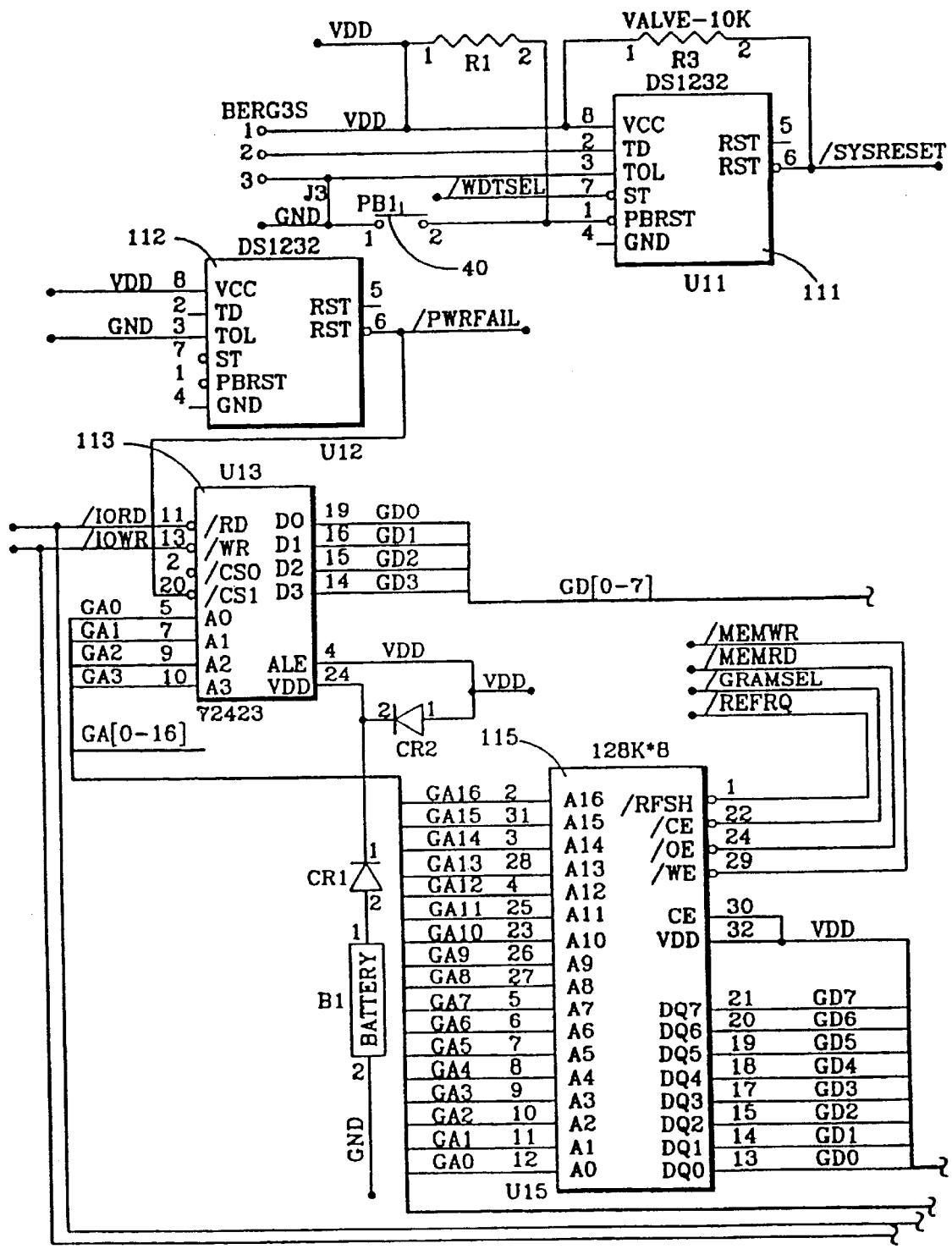
FIG. 5 is a schematic of RAM, real time clock, and a power failure detector for the data receiver and storage device in accordance with the present invention.
Figure 5A:
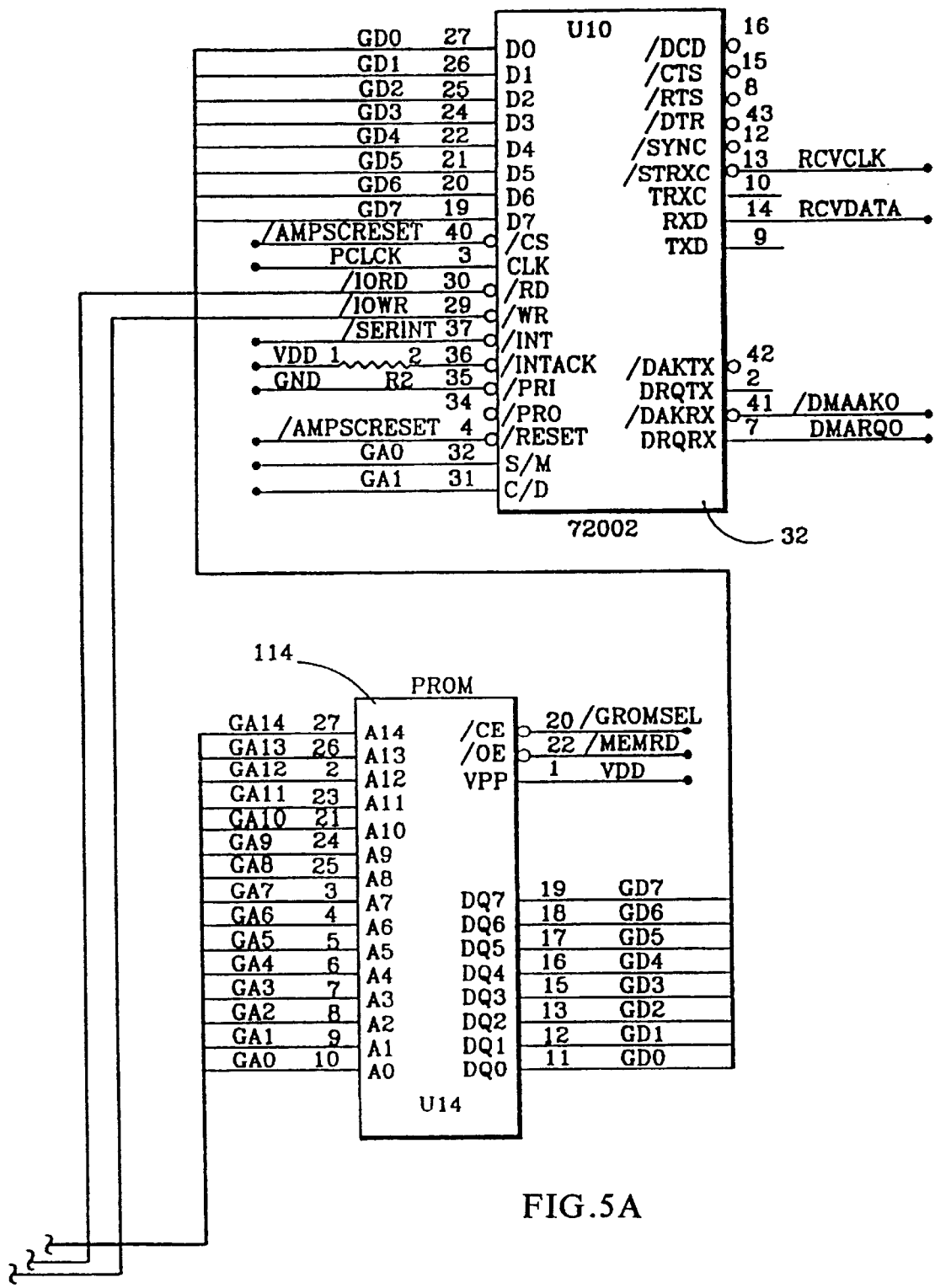
FIG. 5A is a schematic of a PROM and serial controller for the data receiver and storage device in accordance with the present invention.

Referring to FIG. 5, reset switch 40 which is also shown in FIG. 1, may be used to reset apparatus 20. Watch dog timer component 111 must receive a signal at regular intervals to avoid resetting apparatus 20 as an additional security measure and also to assure proper program function. Device 112 generates a power failure signal to switch the real time clock (RTC) 113 into a protected mode and notify microprocessor 44 a power failure is imminent. It is contemplated in an alternative preferred embodiment that device 112 and 113 may be replaced by a single component such as a micro-A 691 device. The '691 device also has a battery control signal which may be used to apply back-up battery power to scratch memory so (FIG. 1) so that game scores could be retained after the power has been disconnected. This is an alterative from that of using diode circuitry such as CR1 and CR2 as is shown. Of course, it is possible that other circuitry could be developed to perform these same or similar functions.

RTC 113 provides the current date and time. This is used to compare with the date and time information received from the cable channel. If there is a mismatch, microprocessor 44 will not process the data received. This function is used to discourage the taping or pirating of the information received from the cable.

Memory banks 80 and 94 (FIG. 3) may be implemented via RAM device 115 and ROM device 114 respectively. The Read only Memory (ROM) device 114 (FIG. 5A) contains the software required to run and process information received from the cable channel. The ROM memory for alternative preferred embodiment is anticipated to be moved to on-board ROM on the microprocessor 44. Some provision may be made to allow for changing the algorithms for decoding encrypted information as necessary to avoid pirating. In such a case, either PROM's (programmable read only memory) which a serviceman can change out, EEPROM's (electrically erasable PROM's), PEROM's (programmable and erasable read only memory modules), or other devices may be utilized for changing the algorithms automatically over a transmission medium. In a preferred embodiment, ROM 114, may be represented by block 94 in FIG. 3, resides in the upper most 128 Kbyte memory bank.

The RAM device 115 in FIG.5, which may be represented by block 80 of the memory map in FIG. 3, may be used to temporarily hold data received from the serial communication device 32 (FIG. 1). Afterwards, the data can be moved to the appropriate memory bank 84–92. An additional RAM memory bank 82 may be added as desired. In accordance with the present invention, RAM 115 is may be allocated as shown in block 96 of FIG. 3.

Serial communication device 32 (FIG. 1 and FIG. 5A), in a preferred embodiment, is a micro PD72002 advanced multiprotocol serial controller (AMPSC). Device 32 is generally used to take the data and clock information from receiver 30 (FIG. 1), sync the data information coming in according to the clock information, convert the data from serial to parallel format, and then typically store the computer data into RAM device 115, which is also shown in general as RAM 36 in FIG. 1. In a preferred embodiment, serial communication device 32 is configured to operate as an I/O mapped DMA device so that data received by serial communication device 32 can be stored, as desired, in RAM device 115 without microprocessor 44 intervention. Device 32 can also be used to perform the CRC calculations using hash totals on the received data to determine if the data received is valid.

Figure 6:
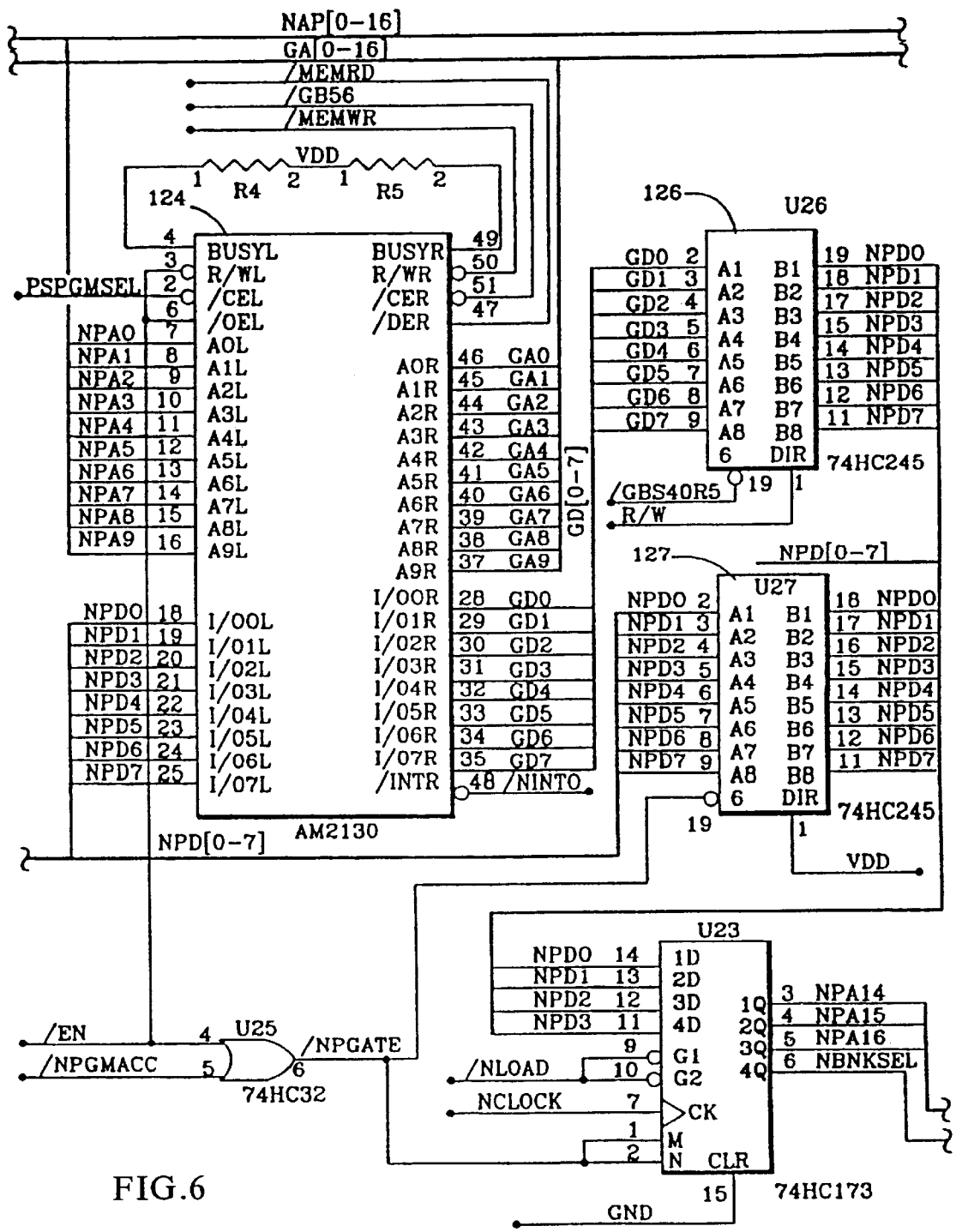
FIG. 6 is a schematic of a primary program dual input RAM as well as address and data bus gating circuitry for the data receiver and storage device in accordance with the present invention.
Figure 6A:
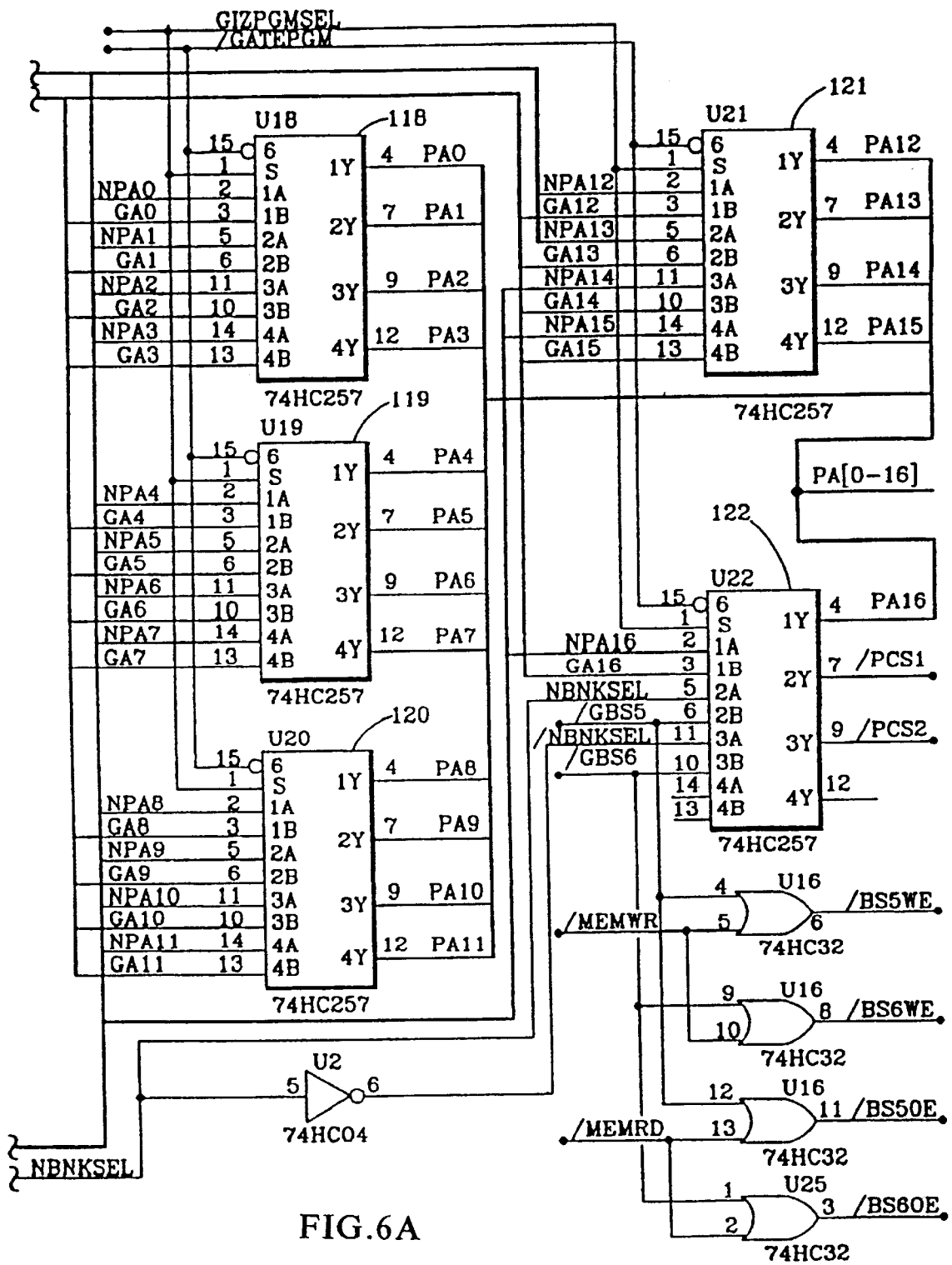
FIG. 6A is a schematic of address bus gating used to select which processor has access to secondary program RAM in accordance with the present invention.

Referring to FIGS. 6 and 6A, primary program memory bank 92 of FIG. 3 may be implemented by means of a dual port memory device 124. This memory may be used, in a preferred embodiment, to hold the code and menu screens for the NINTENDO™ processor in a Nintendo™ video game player. At power up, microprocessor 44 may move the appropriate initialization NINTENDO™ processor code and main menu screen into memory 124. This process may occur sequentially when initialization code stored in ROM contains start-up screens such as FCC warnings. Then the menu screen would be shown after retrieval from a CATV. When menu information is available, microprocessor 44 allows the Nintendo processor to access memory 124. Memory 124 could contain dedicated memory locations for each of the two processors. These memory locations may contain control information that is passed to processor 44 to signal which game has been selected. Once the selected game has been loaded into, for instance, secondary memory 48 of FIG. 1 which as may be represented by block 88 of FIG. 3, microprocessor 44 may signal the NINTENDO™ processor, by setting a flag with memory 124. When the NINTENDO™ processor detects the flag that load is complete, it will signal microprocessor 44. Then microprocessor 44 may then switch the address and data lines 148 and 150 to secondary program memory 48 for control by the NINTENDO™ processor and its respective address and data lines.

It is contemplated that in an alternative preferred embodiment memory 124 could be replaced with a ROM memory that would hold bode and menu screens rather than having this information passed from ROM 94 (FIG. 3). With this design it would be possible to couple NINTENDO™ program memory and address busses directly to such a ROM memory. Scratch Pad memory 50 (FIG. 1) could then contain menu options. Other RAM, which could then be called Primary Ram, may then have the actual game code. If this alternative preferred embodiment is implemented, then a programmable logic device such as the aforementioned GAL20V8 could be attached to the NINTENDO™ program address lines and used to send interrupts (i.e. Reset, Map Load, etc.) to microprocessor 44 on the unused Port O lines as previously discussed in connection with Port O of microprocessor 44.

The Nintendo Secondary Program Memory 48 (FIG. 1) address selection is provided by means of several 74HC257 quadruple 2-line-to-1-line data selector devices having 3-state outputs shown in FIG. 6A. These include devices 118–122 (FIG. 6A) which provide the means by which either processor can access the memory addresses in program memory 48. Additional control signals from the respective processors are also gated to the memories. Proper processor selection is under the control of microprocessor 44.

It is contemplated in an alternative preferred embodiment that various logic gates and components such as those associated with U25, U2, U16, and device 122 may be replaced by a programmable array device such as that typified by the GAL22V10 device. FIGS. 6 and 6A disclose a typical logic arrangement that could be programmed into a programmable device.

Data buffers 126 and 127 (FIG. 6A) are 74HC245 bi-directional devices used to isolate the data bus of program memory 48 from the data busses of the respective two processors. Microprocessor 44 is responsible for providing the control signals to allow the gating of data to the appropriate processor. These control signals are part of the Port O control lines 152.

Figure 7:
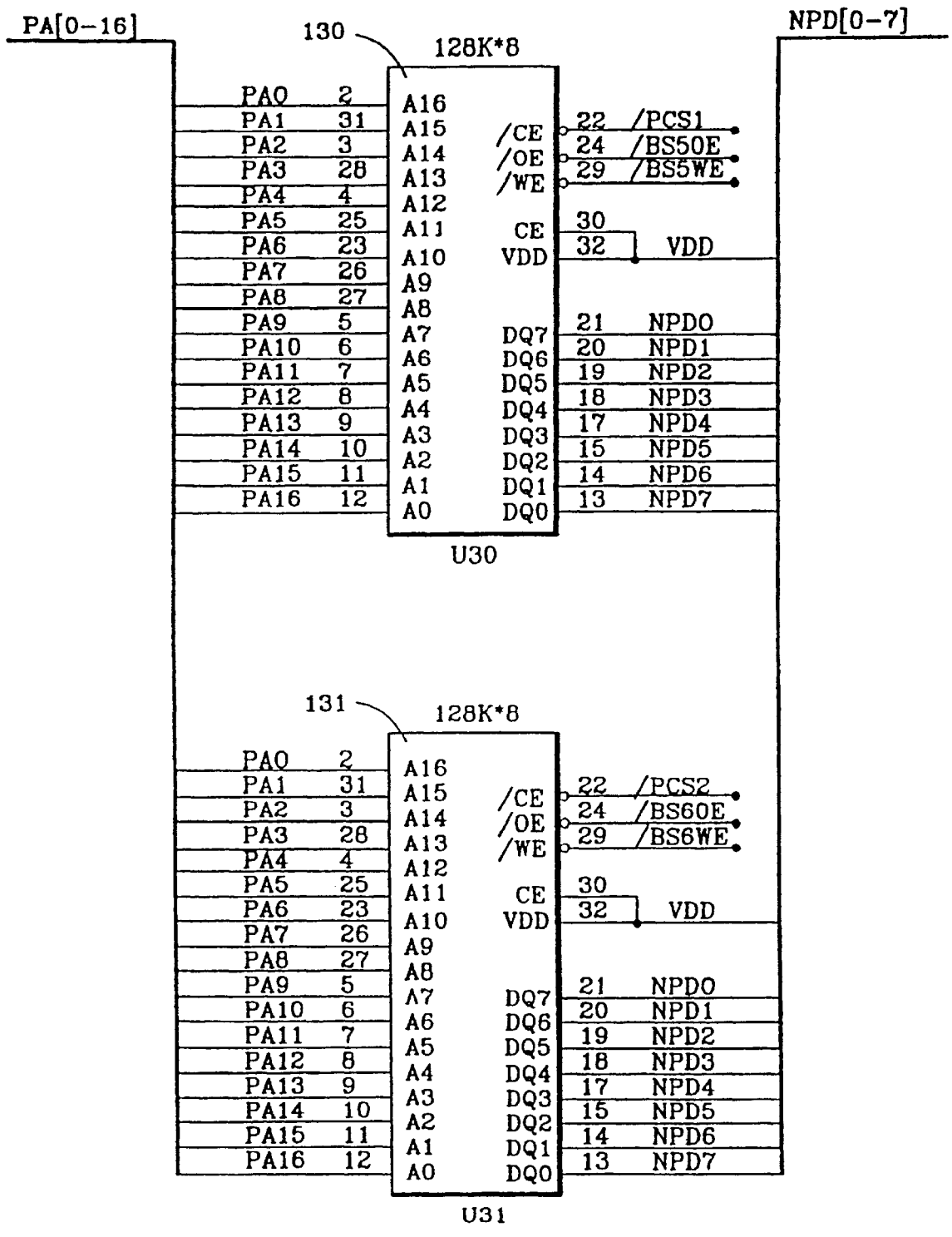
FIG. 7 is a schematic of a secondary program RAM for the data receiver and storage device in accordance with the present invention.
Figure 7A:
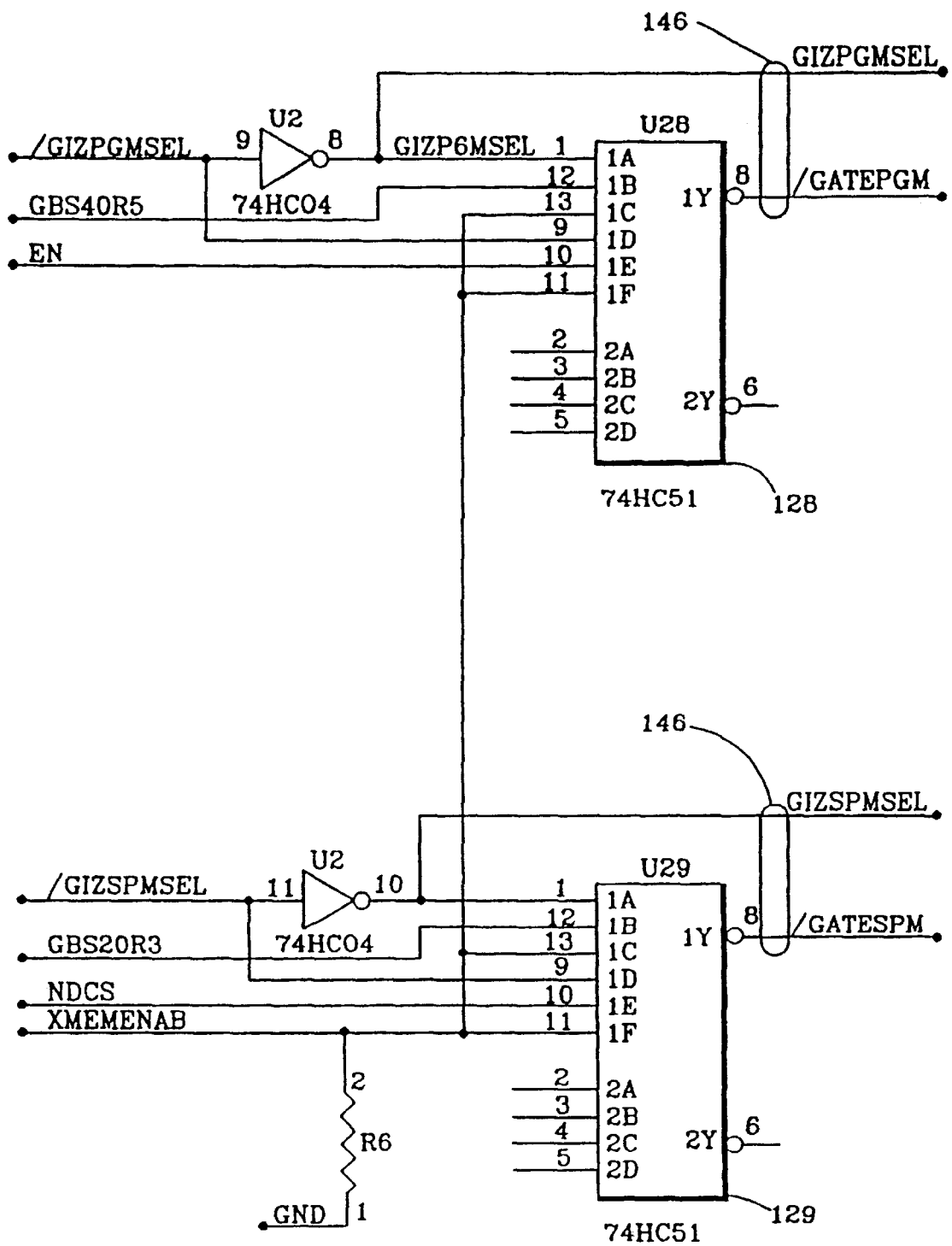
FIG. 7A is a schematic of control circuitry for data and address busses for the data and storage device in accordance with the present invention.

Referring to FIGS. 7 and 7A, NINTENDO™ secondary program memory 48 (FIG. 1) is implemented by RAM devices 130 and 131 (FIG. 7) which may be used to contain the code for the actual video game and optional video screens. Once the game has been loaded by microprocessor 44, RAM devices 130 and 131 may be switched to game player processor control to allow access to the code for executing the video computer game. The addressing mechanism currently used by NINTENDO™ may be implemented to allow complete compatibility with a NINTENDO™ video game player. The signature of the address or data busses to memory devices 130 and 131 or other memory devices may reversed as necessary depending upon the particular pin-outs of the memory devices 130 and 131 which are actually used.

Devices 128 and 129 (FIG. 7A) are 74HC51's whose outputs 146 may be used as control signals to select either NINTENDO™ processor or microprocessor 44 access to NINTENDO™ program memory 48 (FIG. 1) and scratch memory 50 (FIG. 1). It is contemplated in an alternative preferred embodiment that logic control devices such as 128 and 129 will be replaced by programmable logic arrays as previously discussed with other logic components. In such a case, FIG. 7A discloses a possible programming scheme that could be implemented in a programmable logic array. An alternative preferred embodiment that replaces devices 128, 129 and logic devices from U2 could use a programmable device such as the GAL16V8, GAL20V8, or GAL22V10.

Figure 8:
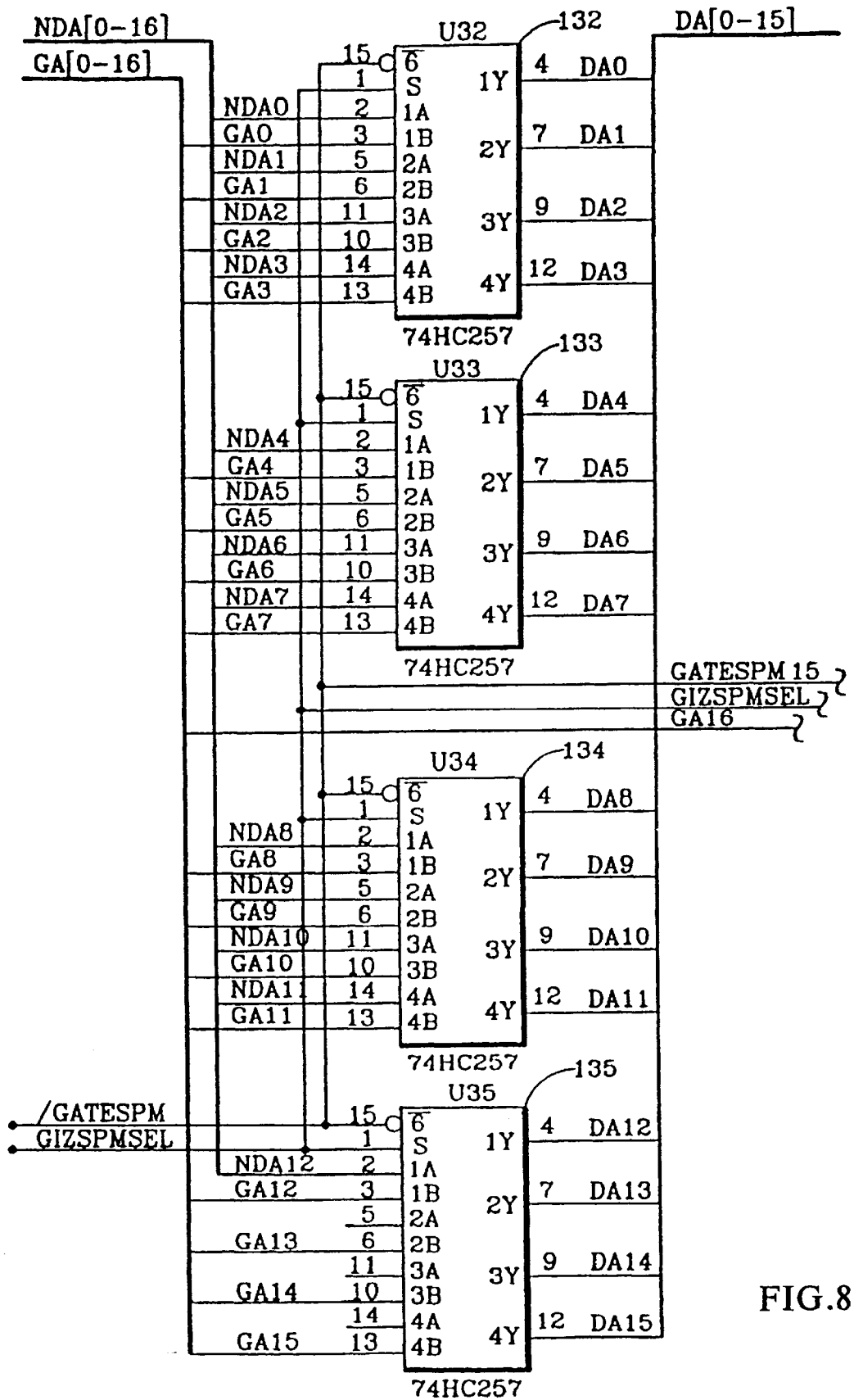
FIG. 8 is a schematic of a scratch pad memory address bus gating for the data receiver and storage device in accordance with the present invention.
Figure 8A:
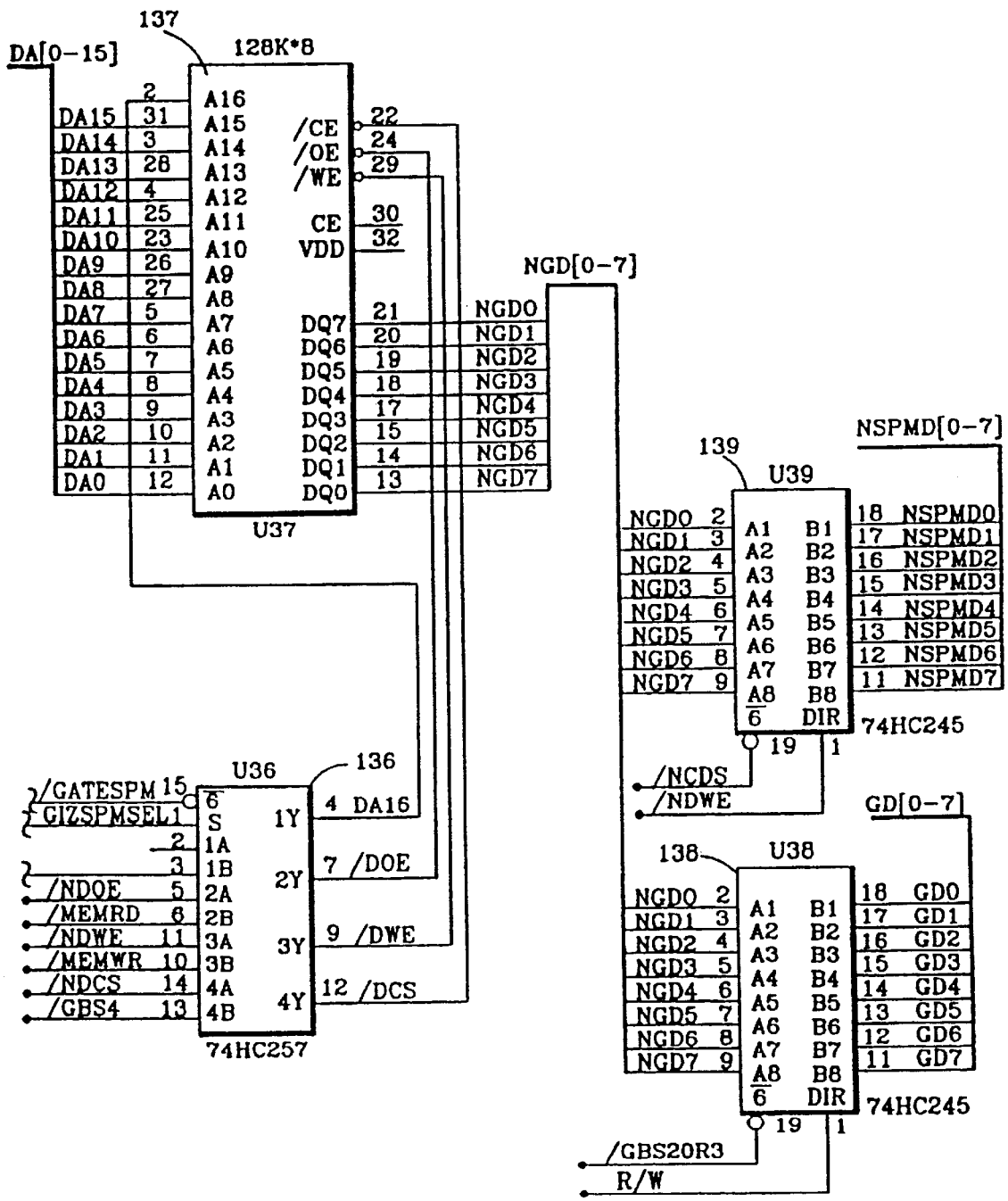
FIG. 8A is a schematic of scratch pad memory and data buffers for the data receiver and storage device in accordance with the present invention.

In FIG. 8A, Nintendo Scratch Pad memory 50 (FIG. 1) may be implemented using RAM device 137 which will typically contain game screens and may contain menu options in an alternative preferred embodiment. RAM 137 may be employed to hold the static screens for a particular game or screen information extracted from program memory 48. The information or general use for information in RAM 137 is largely game dependent. This memory may also be used in an alternative preferred embodiment for parameters back and forth between apparatus 20 and a NINTENDO™ processor 330 (FIG. 14).

Data buffers 138 and 139 (FIG. 8A) are used to isolate the data bus for memory 137 from the two processors. Microprocessor 44 is responsible for providing the control signals to allow gating of data to the appropriate processor. It is contemplated in an alternative preferred embodiment that 74ACT245 data buffer devices be used rather than the indicated 74HC245 devices. Control signals are used to control these gates which originate with microprocessor 44.

Selector devices 132 through 136 (FIG. 8) perform the same function of address bus selection for Scratch Pad memory 50 (FIG. 1) as do selector devices 118 through 122 (FIG. 6A) for program memory 48 (FIG. 1) as previously described. It is contemplated in an alternative preferred embodiment that device 136, which is used mostly for control logic, also be programmed into a programmable array logic device such as a GAL20V8 as described earlier with other logic circuits. Additional circuitry may be programmed into a programmable array logic device to allow a video game player manufacturer, such as NINTENDO™, to incorporate their protection devices into such a programmable device.

Figure 9:
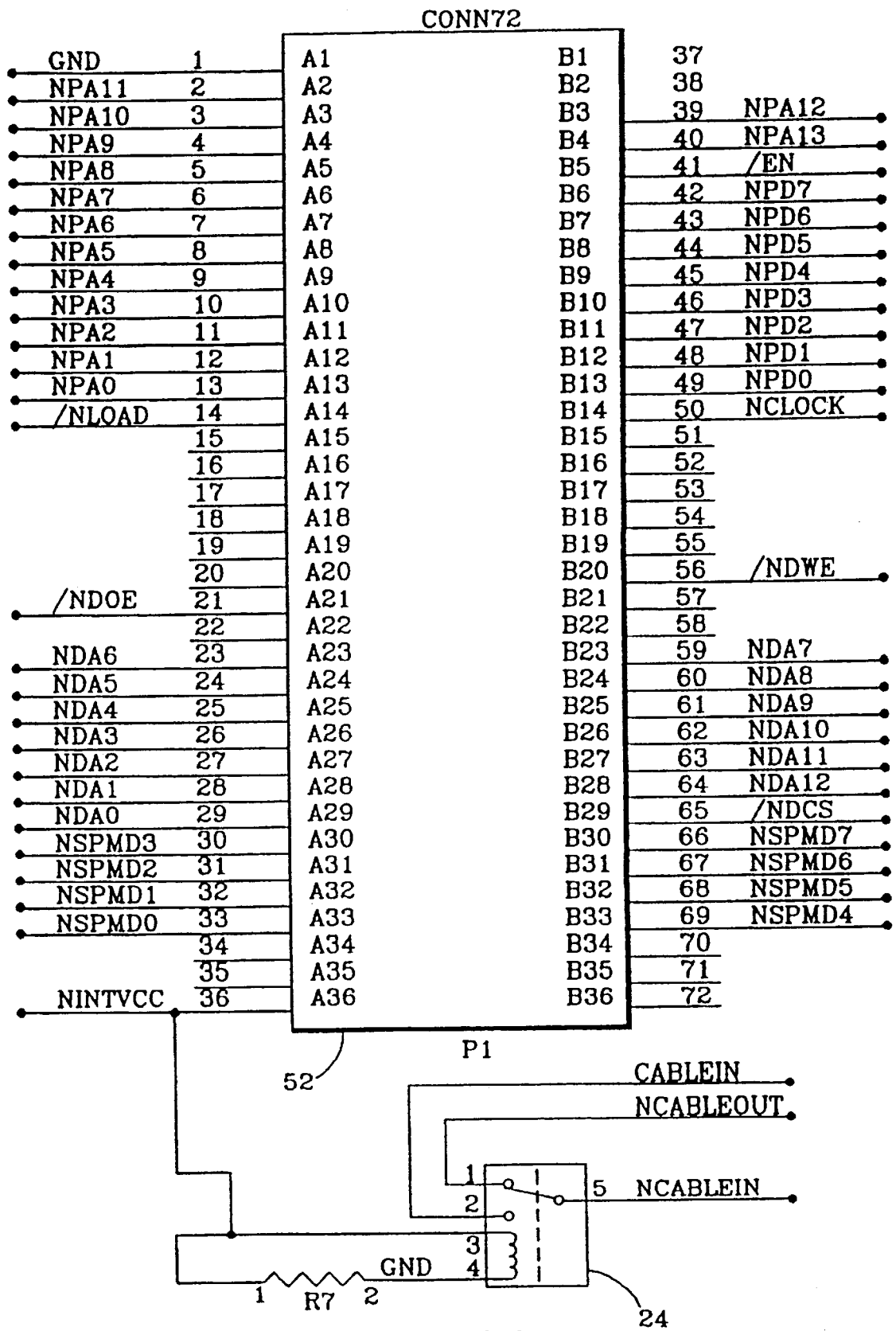
FIG. 9 is a schematic of a NINTENDO™ cartridge connector and a cable switch relay for the data receiver and storage device in accordance with the present invention.

FIG. 9 shows NINTENDO™ cartridge connector 52 with signal pin outs in a preferred embodiment for a NINTENDO™ video game cartridge. Apparatus 20 (FIG. 1) provides identical interface to this connector, but under the control of microprocessor 44. Connector 52 is divided into two separate address and data busses. One set of busses access primary and secondary program memories 46 and 48 (FIG. 1), while the other set of busses provides the access and control for Scratch Pad memory 50 (FIG. 1). The signal lines from connector 52 provide a physical connection between the internal NINTENDO™ processor with its address, data and control signals and the appropriate apparatus 20 circuitry. The same is true of the Scratch Pad memory lines which physically connect between all relevant NINTENDO™ address, data, and control lines and the appropriate circuitry in apparatus 20. Relay 24 is also seen as controlled by power supplied by the NINTENDO™ game player set. The addressing mechanism currently used by NINTENDO™ has been implemented to allow complete compatibility with a Nintendo video game player.

It is also contemplated that presently unused pins A34, B34, A35, and B35 may be used for additional control signals from the NINTENDO™ processor 330 (FIG. 14) to be used with protection circuitry, such as that used by NINTENDO™, that may be incorporated into programmable array devices along with other bus control logic.

Figure 15:
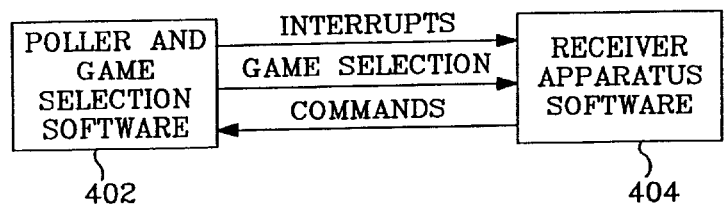
FIG. 15 is a block diagram showing two basic groups of software for the overall receiving apparatus according to the present invention.

Software to operate apparatus 20 is divided into two groups as see in FIG. 15. Group 402 NINTENDO™ Poller Software is responsible for displaying menus and options, as well as the specific game or option to run. If used with a NINTENDO™ game player, this software would be written in the native Nintendo processor (6502) language.

Receiver apparatus 20 software (RAS) 404 is responsible for maintaining communication between a game player such as the NINTENDO™ game player and apparatus 20, as well as controlling and directing the flow of information received from the cable channel.

The NINTENDO™ Poller Software (NPS) 402 resides in ROM, which as discussed as an alternative preferred embodiment, may be represented by Secondary program memory 48 (FIG. 1). Predefined locations in Scratch Memory 50 (FIG. 1) may then be used for command reception, game selection, as well as communications and/or commands between a game player processor such as the NINTENDO™ game player and microprocessor 44.

NPS 402 is invoke upon a RESET condition within a game player such as the NINTENDO™ game player. NPS 402 causes a menu to be displayed on the game player and allows selection of a game or option. NPS 402 communicates this to RAS 404 software module. In a preferred embodiment where all variables, parameters, and/or requests, were located in Scratch memory 50, location pointers which would show where this information is located would also be in Secondary Program Memory 48 ROM.

NPS 402 would provide the software which would allow pointing devices such as joy stick control 332 (FIG. 14) to be used to select a chosen game. After selection of a game or option, NPS 402 would poll a dedicated location in, for instance, Scratch Memory 50, to determine when the game or option has been successfully loaded. After loading of a game, NPS 402 waits until control of the busses to Primary Program Memory 46 is shifted over to game player processor 330 (FIG. 14) such as the NINTENDO™ processor. At this time, the game player or NINTENDO™ processor is reset and code execution of the actual game or option begins.

Figure 16:
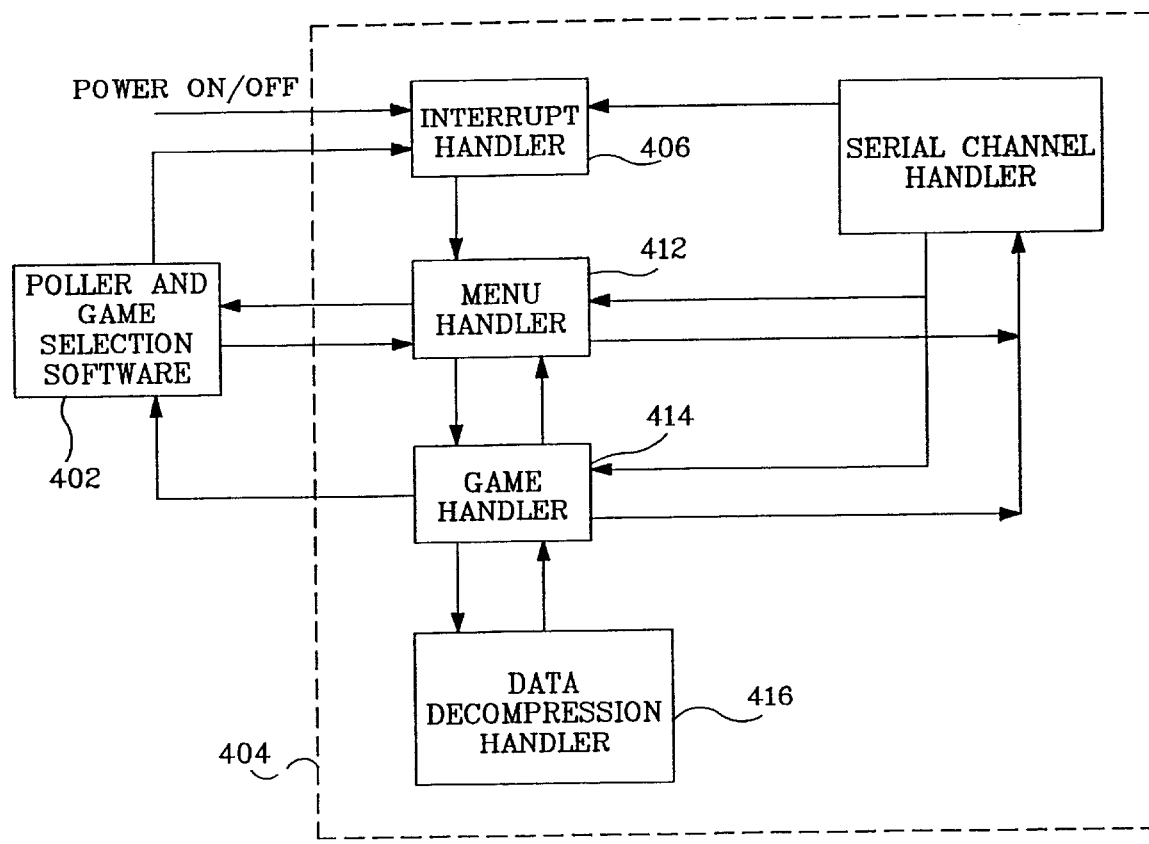
FIG. 16 is a more detailed block diagram showing a software flow diagram of the FIG. 15 Receiver Apparatus Software block according to the present invention.

Receiver apparatus 20 software (RAS) 404 is comprised of five sub-modules as shown in FIG. 16. RAS 404 may reside in ROM. This ROM is, in a preferred embodiment, anticipated to be located on-board processor 44.

Interrupt Handler (IH) (406) is responsible for intercepting all interrupts. When microprocessor 44 is interrupted, IH 406 will determine the cause of the interrupt and call the appropriate process for that particular interrupt. A POWER-ON interrupt (see FIG. 16) is generated any time power is cycled to microprocessor 44. IH 406 responds to this by running internal diagnostics, initializing all run-time parameters, initializing all pointers and cables, and building the basic menu structures in a RAM memory accessible to both microprocessor 44 and game player processor 330 such as a NINTENDO™ game player. In a preferred embodiment the RAM memory used for this would be Scratch pad memory 50. IH 406 would also cause serial controller 32 to be initialized.

A power on reset code sequence is initiated by pressing reset button 40 (FIG. 1), video game player power restoration, or a code failure (via watch dog timer circuit). At this time, all internal pointers, counters, etc. are re-initialized. NPS 402 executes polling code. The system clock to serial communication device 32 (FIG. 1) is disabled and a reset pulse initializes serial communication device 32 internal registers after which system clock is re-enabled. DMA channels are reinitialized as well as all memory maps. On completion of initialization, cable data reception is enabled. Serial communication device 32 looks for a start of the data sequence and when detected, transfers control to Menu Handler 412.

A PWRFAIL (see FIG. 1) interrupt (or power-off interrupt) would cause IH 406 to turn off and protect various portions of hardware and software areas within apparatus 20, such as, for instance, real time clock 34.

Serial Channel Handler (SCH) 410 handles all incoming data received from serial controller 32. SCH 410 configures serial controller 32 in response to interrupts. SCH 410 also initializes and controls DMA channel activities for serial channel data. If a packet of information is received that indicates errors, SCH 410 well set the appropriate flags for packet reception status indicators in the buffer pointer table as is subsequently discussed.

Menu Handler (MH) 412 is responsible for maintaining the format of, and information for each game or option that is currently available for selection. Menu information is transmitted prior to the start of game or option transmissions. The information contained in the menu data packet will contain the name of the games or options, the size of the games or options, and other control information. As discussed subsequently, the control information can contain certain commands, game or option interleave information, disconnect numbers, encryption/decryption keys, etc.

MH 412 creates a table of menu information which includes entries for each game or option. In a preferred embodiment, up to 32 games or option entries may be maintained at any one time although expansion is available. Although subject to modification, it is anticipated that each entry will contain 32 bytes which will allow for 26 ASCII characters for the name, provide the size of the game or option, and indicate types of NINTENDO™ or other type of game player memory is required.

Game Handler (GH) 414 software module is responsible for the overall selection and control of the memory between microprocessor 44 and the game player processor 330 such as a NINTENDO™ processor. GH 414 sends and receives messages from game player processor 330 through use of dedicated addresses in shared memory. GH 414 interprets and initiates appropriate responses to commands received.

GH 414 maintains a table of pointers that correspond to the different blocks of data that will contain the compressed game or option selected. Each entry in the table contains the address of its respective data block, the status of that block, and the size of that block. As each data packet of the selected game or option arrive, the data is moved to its respective buffer memory location. After the packet is received, the appropriate status bits for that packet are set.

In a preferred embodiment, it is planned to use contiguous memory locations within RAM 36 (FIG. 1) as data buffers. GH 414 extracts time stamp and other information from each data packet and updates the buffer pointer table. Typically, after all data has been received, GH 414 validates the time stamp information of all packets received, insures that all packets have been received successfully, and if current and correct, will call Data De-Compression Handler (DDH) 416. Provisions have been made to allow multiple games or options to be buffered within apparatus 20 memory in compressed format. This provision allows for a quicker response of game or options selection, especially if the user continually selects the same games or options.

DDH 416 is invoked after the entire selected game or option has successfully been received by apparatus 20. DDH 416 initializes all required pointers for the blocks of compressed data, as well as the pointers for the destination address in Primary Program memory 46 (FIG. 1). Once the data has been successfully de-compressed, DDH 416 notifies GH 414 and status is updated.

The data received is expected to be in a compressed format such as provided with the commercially available DCS221 Data Compression Software. Compression allows for greater amounts of data to be transmitted in fewer bytes of data and thereby increases the overall data transmission rate by a factor of 4 to 8.

Figure 17:
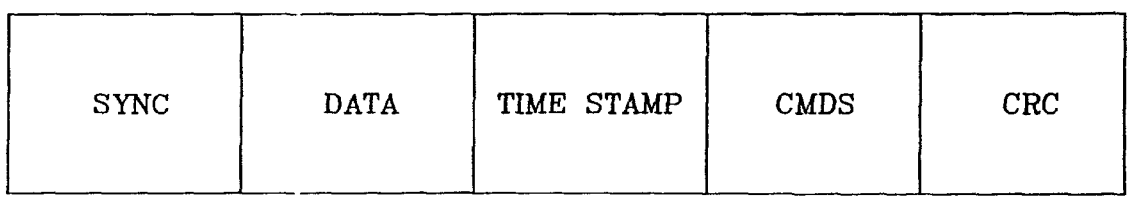
FIG. 17 is a block diagram showing the format of transmitted data packets according to the present invention.

FIG. 17 shows a data packet format in accordance with the present invention and contains information relating to the games or options, control information, and also the software for the game or option itself. All the data within the packets may be compressed and/or encrypted. The length of the packet may be set a specific size or be variable.

The SYNC portion of the packet is used to synchronize the receiver. This information is generated by transmitter 78 (FIG. 2), and typically discarded after use by serial channel controller 32 (FIG. 1). The DATA portion of the packet contains the software for the game or option, menu data, disconnect information, or any type of information that needs to be communicated to the receiver apparatus 20. TIME STAMP contains the actual date and time the data was transmitted. This data is used in conjunction with RTC 64 (FIG. 1). After a packet is received, GH 414 extracts the TIME STAMP info and compares it to the actual time received. If the time difference is greater than a certain amount which may be varied, the packet may be rejected.

The CMS or command portion of the data packet may contain embedded commands or provide information. The command or directive may be of the informative type, indicative of there being a subsequent packet, or signal the end of packet for the game or option. In a preferred embodiment provisions are made for up to 127 commands and 127 informative codes.

The CRC is a calculation done on the data as it is being transmitted and is appended to the data packet as it is transmitted. Apparatus 20 performs a CRC check on the data as it is received. If there is a mismatch, the packet status is flagged as being in error. CRC information is used only by serial controller 32.

It is generally anticipated that packet transmission sequence will be interleaved. Therefore, in sending 10 games, the first packet of each game may be sent and then the second and so forth. Such a pattern would have an interleave factor of 10. It may be that a different interleave factor will prove to be more optimal.

FIG. 2 provides a block diagram schematic of a preferred embodiment transmitter apparatus 78 according to the present invention. Generally, microprocessor 68 is used to send data in parallel format to serial communication device 62 which will send the data in serial form to transmitter 58. It is anticipated that processor 68 be functionally identical to processor 44 used in the receiver 20. For instance the NEC V25+, a commercially available processor may be used. Microprocessor 68 formats the appropriate game or options information for transmission. Bus control section 74 provides signals required to select I/O devices or ROM and RAM (both of which may be included in RAM 66) as well as decodes the bus control signals, and provides memory and I/O read and write signals.

Reset and Watch Dog Timer 64 provides timing circuits to reset transmitter 78 after initial power up, after a power failure, or when reset button is pushed. WDT 64 is used to reset the system if for some reason the software with the processor hangs up. WDT 64 must be strobed by the software periodically or a reset occurs. Real time clock 64 with battery 76 provides a real time value to be included in the transmitted computer data for comparison at the receiver.

Serial controller 62 converts data from parallel form to serial form into a defined format. The configuration of serial controller 62 is defined by setting data in the internal registers. The "A" channel of serial controller 62 is configured to run as an I/O mapped DMA device and is responsible for supplying all information to the cable transmitter section. This configuration allows the information transmitted by serial controller 62 to be retrieved from local RAM 66 without the intervention of processor 68. Serial controller 62 also calculates and appends CRC to the transmitted data packets. The "B" channel is an optional port that can be connected to an external modem or be used as a DCE port.

In a preferred embodiment RAM 68 contains 1 M byte of memory divided into 8 equal banks of 128 K bytes each. It is anticipated that 126 K bytes will be ROM with the rest used as RAM. ROM contains the software to process information prior to transmission, interface to the various serial channels, disc drives, and compression routines. By using a CMOS PEROM (FLASH) device the processor will be able to reprogram itself. The RAM is used to hold data before transmission onto the cable and after they are removed from static storage 72. RAM contains all the required control tables, information, and pointers to the packets for transmission. In a preferred embodiment, one bank of RAM will be battery backed up. This portion would contain configuration information, access codes, phone numbers, disconnect ID's, and encryption and decryption keys.

The DTE interface port provides an optional serial interface to transmitter 78.

It is anticipated that an internal modem also be available for specific cable needs or other purposes. Such a device may be created with the combination of the DS2245 and DS2249. This combination provides a microcommunication subsystem that can directly connect to a public switched telephone network via a RJ11connector. The combination of these two devices complies with FCC Part 68. The DS2245 modem option includes all circuits to modulate/demodulate and be compatible with Bell 212A/103 and CCITT V.22 bis/V.22/21 type modems and may interface with the processor by a standard PC AT/XT type of interface. Additional such devices could be added if desired or necessary.

The transmitter portion of the modem, with the use of an Auto-Dialer, may be used to call a central distribution point to automatically request updates, give notification of failures or malfunctions or send game data. The receiver portion can be called to receive updates and/or install new games and options.

Static Storage device 72 is used to store video game computer data. It is anticipated that a Hard Disc Drive will be used and will be interfaced to microprocessor 68 with a standard PC AT/XT HDD type of interface. All data that is transmitted over the cable channel reside on the disc in a specific sequenced format.

It is believed that a written description of FIG. 2 transmitter 78 circuitry coupled with reference to drawings for apparatus 20 will provide an adequate description to enable one skilled in the art to practice the invention.

Figure 18:
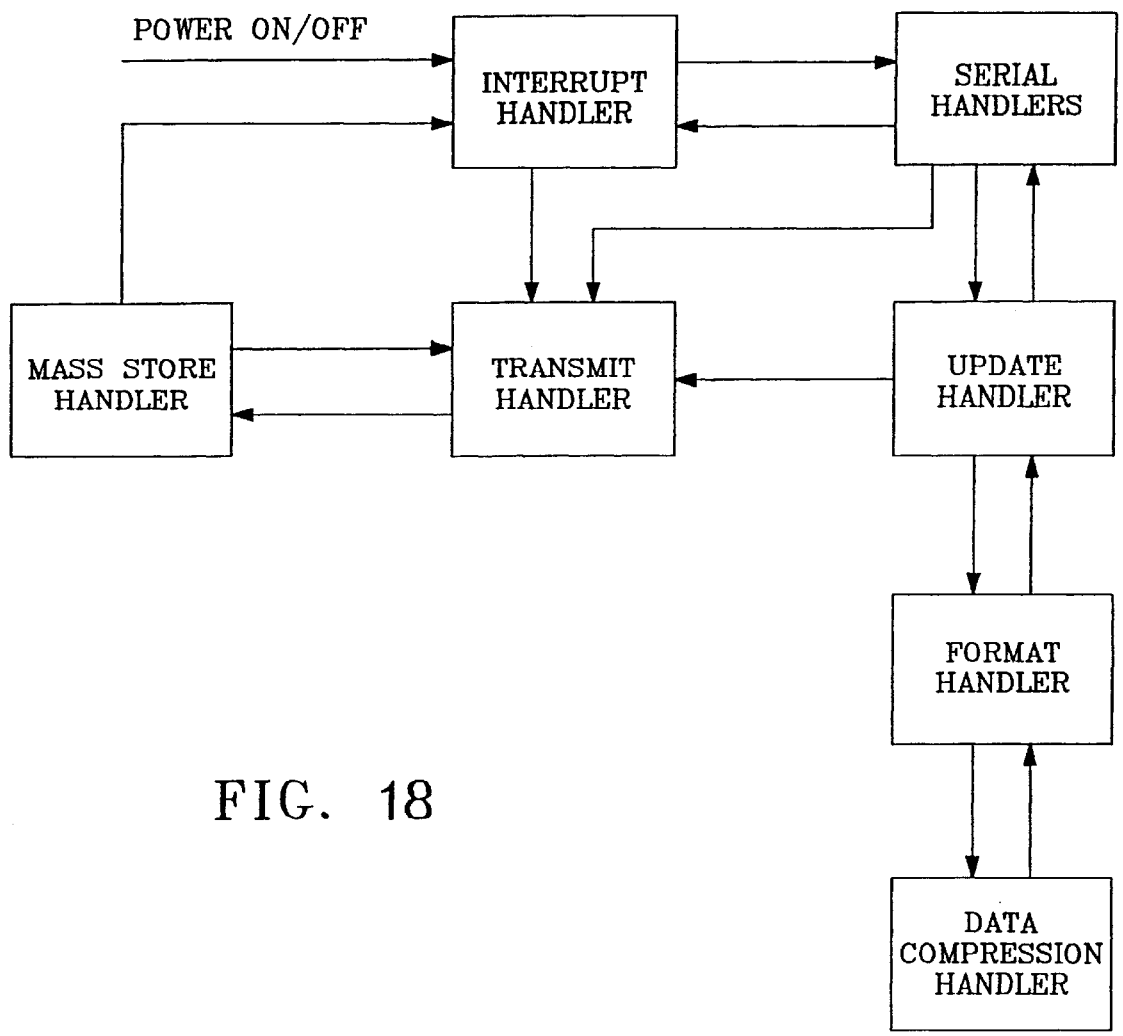
FIG. 18 is a block diagram for software controlling a data transmitter according to the present invention.

FIG. 18 shows a software diagram for transmitter 78 in accordance with the present invention. In a preferred embodiment seven major software submodules are used. The interaction paths between the submodules are illustrated in FIG. 17 and subsequently described in more detail.

Interrupt Handler 430 is responsible for intercepting all interrupts and starting or invoking the appropriate response for the particular interrupt. IH 430 is similar to IH 406 already described for use with apparatus 20.

Serial Handlers 436 module is generally composed of four different Serial Channel Handlers—each handling a specific part of transmitter 78 hardware. All serial handlers communicate with Update Handler 440 except the Cable Channel Serial Handler (CCSH).

The CCSH is responsible for controlling and monitoring Channel A of serial controller 62. CCSH performs generally similar duties to that of SCH 410 described earlier. In addition, CCSH initializes the starting buffer pointers for the packets to be transmitted within the MPSC and updates the status after each packet is transmitted. The data packets are transmitted in the format shown in FIG. 17.

The DCE handler receives and transmits information from Channel B having DCE equipment or other external telephone modem equipment. Typically this port is capable of running at speeds up to 9600 bps. All requests or information are directed to or received from Update Handler 438.

In a preferred embodiment, the DTE handler is responsible for receiving and transmitting information to and from the DTE port. The DTE handler (with the appropriate external equipment) has the capability of establishing a full duplex communications link. The DTE handler directs all requests or information to the Update Handler.

The Internal Modem Handler is responsible for receiving and transmitting information to and from any internal modem ports. The IMH has the ability to auto answer incoming phone calls as well as initiating phone calls by dialing numbers. XMH interacts with Update Handler for answering and requesting information.

Mass Storage Handler (MSH) 432 takes care of all low level interface to a disc drive which may be used as static storage 72 such as format, read, write, erase, etc. The disc drive, in a preferred embodiment, may be partitioned into three basic areas. This would include an Active Game or option area, New Game Area, and Temporary or scratch area. The Active area would actually consist of two complete Game or Options Areas and Transmission Handler 434 would determine which of these areas to use. The New Game area could be used to store the new games or options that are slated for release for the upcoming month. The Temporary area could be used for a scratch area for temporary files for processing by the various internal handlers. MSH 432 handles all activity related to a disc drive and all requests from other internal handlers will be queued on the disc request output queue. MSH 432 retrieves the requests from the queue, initializes the DMA channel, and initiates the request.

Transmission Handler (XMH) 434, in a preferred embodiment, may take care of the overall transmission of games or options to the cable channel. XMH 434 retrieves sequenced games or options from mass storage 72. After each sequence is successfully loaded, XMH 434 appends the proper time stamp and/or command information to each packet. XMH 434 then queues the packet sequence for cable transmission.

XMH 434 maintains two tables of pointers that correspond to the different blocks of data that comprise the current sequence packets to be transmitted. As one table is being loaded from disc, the other table is being used for current cable transmission sequence. Each entry in the table would normally contain the address of its respective data block, the status of that block, and the size of that block. XMH 434 and SH 436 can be modified according to the type of broadcasting medium used although CATV is used in a preferred embodiment of the present invention.

Update Handler 438 receives and sends commands and/or new games or options. Typically, a specific command sequence along with the proper pass word and access information must be received by UH 438 before any processing will be done. If a new game or option is to be added to the sequence of games or options to be transmitted, UH will insure that the game or option was properly received, and then store this information with mass storage 72. After proper reception UH will invoke Format Handler 440.

Figure 19:
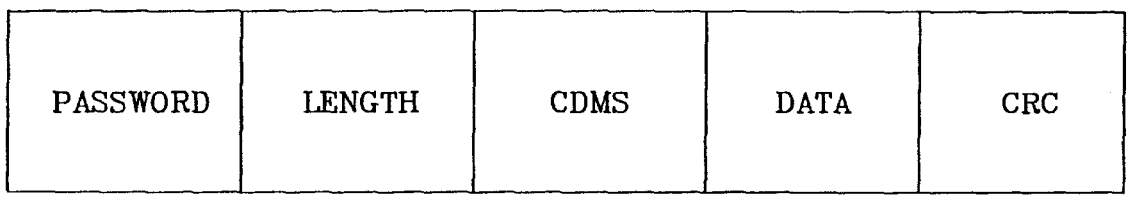
FIG. 19 is a block diagram showing the format of command data packets received by a data transmitter according to the present invention.

The command packet format is shown in FIG. 19. The password and access information may be, in a preferred embodiment, 64 bytes long and is expected to be initialized prior to transmitter shipment. Length describes the length of the transmission. The Command or Information to be processed comes next in the data packet format scheme. Then the actual data transmitted or to be received. A checksum or CRC is also included for data accuracy checking. The password may contain a decryption key if the data transmitted is encrypted. Provisions have been made for 256 commands and 256 informative codes although this can be varied as desired.

Format Handler (FH) 440 is responsible for formatting a new game or option. FH 440 is invoked by UH 438 if a new game, menu, or general broadcast command has been received. Typically FH 440 retrieves this received data from static storage 72 after it is compressed by Data Compression Handler 442. After successful compression, FH 440 will calculate the size of the update, calculate the number of blocks for the game or option, resequence the menu for transmission, and store and sequence the information on the disc in the aforedescribed interleaved manner.

Menu information is maintained and updated by FH 440 in the format previously described. FH 440 maintains the format of and information for each game or option that is currently available for selection. This menu information is generally transmitted prior to the start of the game or option transmissions. The information contained in the menu packet may contain the name of the games, the size, and other control information such as certain commands, game or option interleave information, disconnect numbers, encryption/decryption keys, etc. After all updates have been applied, TH 434 is notified and the new transmission sequence can begin.

Data Compression Handler (DCH) 442 initializes all required pointers for the blocks of received data, as well as the pointers for temporary storage on a disc or other mass storage device.

Once the data has been successfully compressed DCH 442 notifies FH 440.

Figure 10:
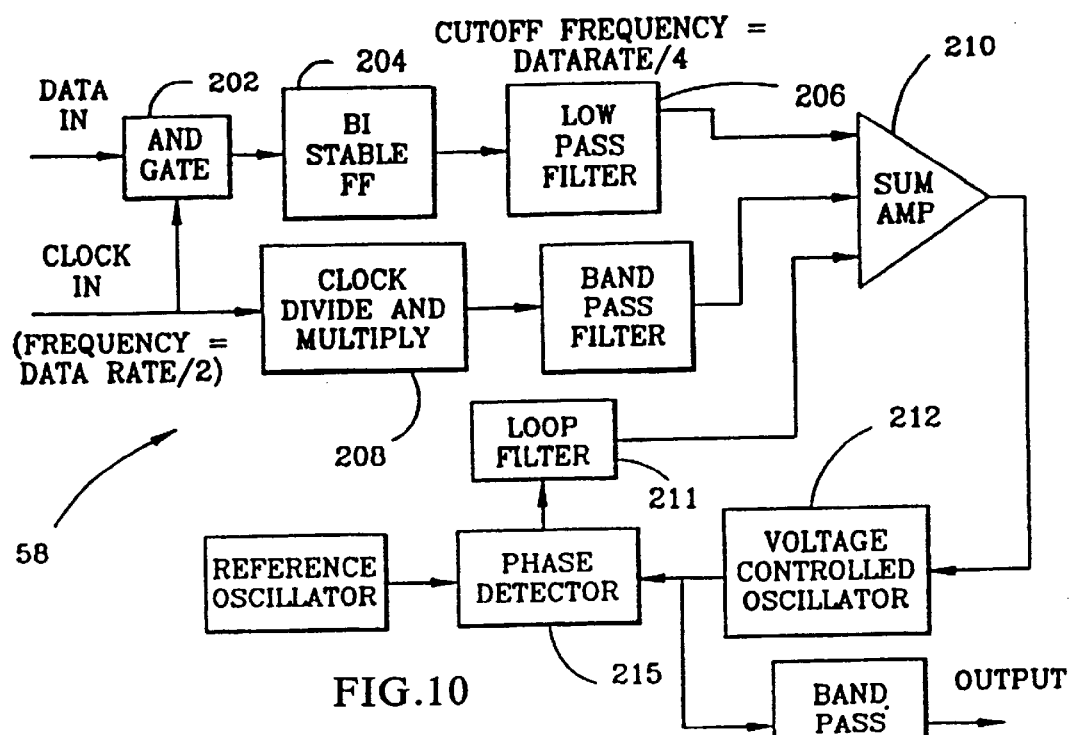
FIG. 10 is a block diagram schematic for the data transmitter in accordance with the present invention.
Figure 11:
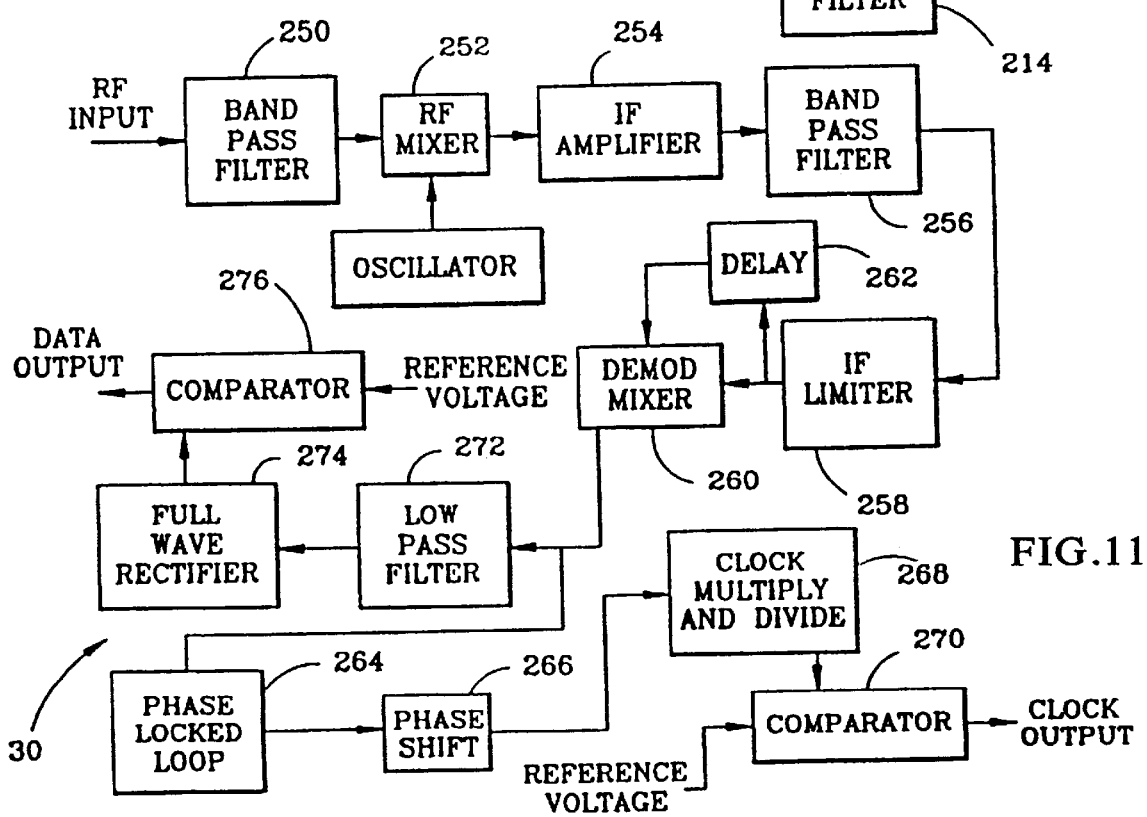
FIG. 11 is a block diagram schematic for the data receiver of in accordance with the present invention.

FIGS. 10 and 11 shows a preferred embodiment data transmitter 58 and data receiver 58.

Data transmitter 58 (FIG. 1), in a preferred embodiment, is an embodiment of a Duobinary Coding transmission scheme (developed by Lenkurt Electric, 1963) as shown in FIG. 10. This coding scheme facilitates a transmission data rate approximately four times the available transmission bandwidth and can be implemented using moderately priced equipment. A bandwidth of 40 KHz would, at the maximum rate, allow data transmission at approximately 160 KHz. Clock (at a frequency of ½ the data rate) and data is applied to AND gate 202. The Clock signal is delayed with respect to the data signal and timed so that even though it is at ½ the data rate, for each data Mark (logic 1) there will be an output from AND gate 202 corresponding with the Clock. The output frequency from AND gate 202 will be further reduced after being toggled through bistable flip flop 204. The resulting signal proceeds through low pass filter 206 to sum amplifier 210. The Clock is divided and multiplied at section 208 to produce a frequency somewhere above the cutoff frequency of low pass filter 206 and between 0.5 and 1.0 times the clock frequency. A trade off between equipment complexity and the maximum theoretical data transmission rate is generally made to set the specific steady state frequency and depends on such factors as the precision of low pass filter 206. However, in a preferred embodiment, the clock may be synthesized in the receiver without being included as an input to Sum Amplifier 210. The output of SUM amplifier 210 frequency modulates voltage controlled oscillator 212. This frequency modulated signal is broadcasted through pass filter 214 to remove spurious signals from the transmitted waveform before being connected to the CATV system. Phase detector 215 and Loop filter 211 set a relatively low cutoff frequency outside the spectrum of the data and transmitted clock.

Data receiver 30, as described in FIG. 11, is a standard superheterodyne FM receiver consisting of bandpass filter 250, RF mixer 252, intermediate frequency (IF) amplifier arid IF filter 254 and 256, IF limiter and FM demodulator. The FM demodulator is comprised of delay line 262 and demodulation mixer (multiplier) 260. The identical frequency and phase Clock signal is obtained by passing the output of demodulation mixer 260 through components comprising phase locked loop section 264, adjustable phase shift component 266, and multiply and divide component 268. Multiply and divide component 268 performs an inverse change of frequency from that of divide and multiply component 208 in transmitter 58 (FIG. 10). In a preferred embodiment, this component may be deleted if the sync is synthesized at the receiver at typically at a single frequency. Adjustment of the reference voltage with output from multiply and divide component 268 in comparator 270 generally has the effect of modifying the duty cycle of the clock.

Demodulation mixer 260 output also proceeds through low pass filter 272, full wave rectifier 274, and comparator 276 to restore the data signal.

It is anticipated that data may be transmitted by other transmission means such as, but not restricted to, FSK (frequency shift keyed) or AM (on/off keyed) radio frequency channels as may be required or requested by various CATV systems.

Figure 12:
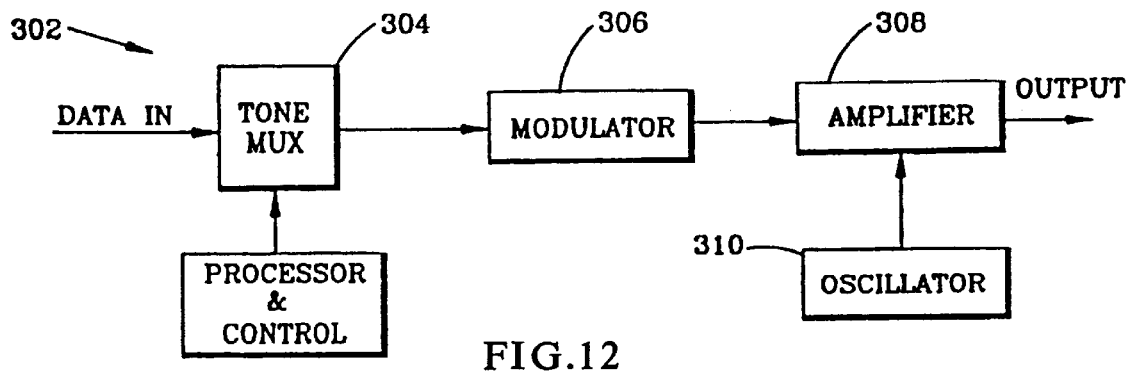
FIG. 12 is an alternative embodiment block diagram schematic for a data transmitter in accordance with the present invention.
Figure 13:
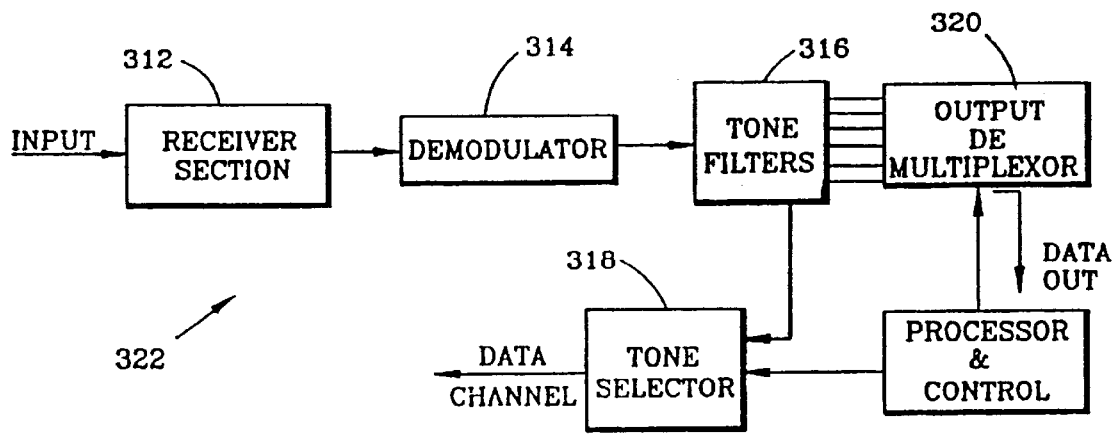
FIG. 13 is an alternative embodiment block diagram schematic for a data receiver in accordance with the present invention.

An alternative embodiment system comprising transmitter 302 and receiver 322 is shown in FIGS. 12 and 13. In FIG. 12, data is multiplexed in tone multiplexor 304. By using suitable tone multiplex equipment 304, up to 100 or more tone channels may be transmitted. Assuming a bandwidth of 40 KHz, a transmission rate of 8 Kbits/second per tone, and using 120 tones, a transmission rate of approximately 1 megabit/sec is achieved. Multiplex 304 output is used by Modulator 306 to frequency modulate amplifier 308 which receives input from oscillator 310. Circuitry for controlling the multiplexor may include serial communications device 62 under processor 68 control, dedicated circuitry, or direct processor 68 control. This signal may drive the CATV system or go through an up converter before being placed on the CATV trunk. Alternatively, 15 tone channels at or above 15 KHz may provide approximately up to 225 kbit/sec transmission rates. Much flexibility between cost, equipment, bandwidth allowances, and speed of data transmission is available. Transmission into other mediums beside CATV, such as through air, would be possible with minor variations. In some cases, the signal-placed on a CATV is rebroadcast or could normally be rebroadcast through the air.

Receiver 322 accesses this radio frequency signal through receiver section 312 and demodulator 314. Tone filters 316 separate the tone channels. Demultiplexor 320 can be used to recombine the data into the original format. Alternatively tone selector 318, under microprocessor 44 direct or indirect control (indirect control may include additional control circuitry), can select any one or a group of single tone channels. For instance, eight tone channels could be used in groups to provide a parallel data path that may correspond to computer data for a single game to be loaded into memory locations having eight bits per location. Alternatively, with 15 modulated tone channels, each tone channel could be used to provide computer data for one video game.

FIG. 14 illustrates basic circuitry for a video game player. Microprocessor and support circuitry 330 are used to execute program control to display the video game. Joystick 332 may be used for input to the video game action. Internal memory 334 and game cartridge memory 342 provide video game data. Generally the video game program is stored in game cartridge memory 342 which is accessible via connector 336. Game cartridge memory 342 is generally part of the video gate player microprocessor primary memory so that addresses used to address game cartridge memory 342 are included in the memory map of the video game player microprocessor. One or more data, address, control busses 340 are used to provide interconnections. NINTENDO™ video game players have two separate data and address busses for accessing the cartridge memory 342.

Other measures to prevent unauthorized use of the broadcast data may include a signature in the interface between said video game player 350 and apparatus 20 which would identify the subscriber's computer and the connectors used in the interface cable. Codes or instructions may be required to be sent from the host computer before apparatus 20 operates, etc. Conceivably, apparatus 20 could be broken into sections, with some sections generally available to the public and other sections or means for controlling unauthorized access being available by subscription.

Maintenance access to the actual circuitry of apparatus 20 may require insertion of a cartridge with memory instructions telling microprocessor 44 to unlock the enclosure thus preventing access to the actual circuitry. A spring loaded switch physically connected to the enclosure may cause changes in the software coding if the enclosure is opened in another manner.

Referring generally to FIG. 1, an overview of operation of apparatus 20 for receiving and storing of video game computer data is now given. Applying power to a NINTENDO™ video game player attached to apparatus 20 connects power to relay 24 so that signals on a CATV signal are available to receiver section 30. A preferred embodiment receiver section 30 is illustrated in FIG. 11. Serial data and clock will be sent, in a preferred embodiment, to serial communication device 32 from receiver section 30. Serial communication device 32 is able to perform CRC checks to insure the validity of data received. Serial communication device 32, using DMA, is expected to then send the data to RAM 36. At this time, the data will typically be checked to see if it is real time data by comparing the included date stamp with a value from real time clock 34. If accepted, microprocessor will unscramble the data as necessary according to algorithms stored in processor 44 ROM. It is expected that some provision may be made for altering periodically the stored algorithms either automatically over the cable, perhaps using EEPROM's, or via servicemen by reprogramming or simply changing out PROMS. Occasional changing of the algorithms would impede unauthorized users who manage to acquire the decrypting algorithms.

After being decrypted, the data may go to the proper addresses in Primary program memory 46, which in a preferred embodiment is dual port memory 124 (FIG. 6). At this point, the NINTENDO™ processor is allowed to take control of Primary program memory and a menu screen will be shown to the subscriber listing the various games that are available. Prior to this screen, processor 44 may have already sent a start-up screen from processor 44 ROM or other ROM to the NINTENDO™ processor providing a message and copyright notice to be shown on the TV. Once the menu screen is shown, the subscriber will be able to choose the game with joystick 332 (FIG. 14). After notification that a game has been chosen, microprocessor 44 will take control of the memory again to determine which video game to select.

Serial communication device 32 (FIG. 1) will send data to RAM 36, where if it is the selected data, it will be unscrambled and sent to the appropriate location in Secondary program RAM 48. Also any necessary data will be sent to Scratch Memory 50 which the NINTENDO™ processor will generally use to keep score or for other game dependent purposes. When the loading of the video game is complete, the Nintendo processor will be notified by the setting of a flag in memory. The NINTENDO™ processor will subsequently request microprocessor 44 to switch the gates to which both NINTENDO™ and microprocessor 44 address and data lines are connected so that the NINTENDO™ processor may have control of the memory and the subscriber may play the game as he would if apparatus 20 were not present so that apparatus 20 is effectively invisible to the NINTENDO™ processor. The above description is of one method of operation and, as discussed in the specification, the sequence of events may vary depending on which embodiment of the invention is used.

On the transmitter end of the CATV, apparatus 78 (FIG. 2) is used to provide video game computer data to the transmission line. Storage of the games is provided in Static Storage device 72 which may include in accordance with the invention a hard disk such as the Prairie 120. A real time clock stamp from RTC 64 is included in the data and decryption keys may be sent with data. The data may be arranged in blocks and stored in RAM 66 prior to being transmitted. Serial communications device may then use DMA to obtain parallel data and convert it into serial format to be sent to transmitter 58 where it will be placed on the cable.

It will be appreciated the present invention can be used in conjunction with home application computers which are generally personal computers specifically designed and marketed for home applications, such as educating children, playing games, balancing a checkbook, writing letters, paying bills, and controlling lights or appliances. A video game player is viewed as a rather specialized type of home application computer generally having joysticks rather than a keyboard for an operator input device. A subscriber host computer for the purposes of the present invention is the computer that performs the ultimate goals of the system, namely processing the computer video game data to allow play of the video game by the subscriber. Application specific data as used in defining this invention would be data which would form an operating computer program such as a video computer game rather than general informative data which might be transmitted such as weather information or grocery prices, etc.

It is thought that the apparatus for sending and receiving subscriber video game computer data and many of its attendant advantages will be understood from the foregoing description and it will be apparent to one skilled in the art that various changes be made in the form, construction and arrangement of the parts thereof without departing from the spirit and scope of the invention or sacrificing all of its material advantages, the form hereinbefore described being merely a preferred or exemplary embodiment thereof. It is clear that other embodiments equivalent to the disclosed preferred embodiments could also be developed using components that may be developed in the future.

What is claimed is:

1. A home subscriber data retrieval apparatus comprising:
   a data receiver for retrieving computer data from a public broadcasting medium;
   a storage medium having a plurality of memory locations; and
   a microprocessor for processing said computer data; said microprocessor controlling said data receiver to select specific computer data and to reject other computer data, such that said microprocessor controls the transmission of said specific computer data to said storage medium via apparatus data, address, and control busses, said microprocessor having access to said computer data over said busses;
   wherein a serial interface is created between said receiver and said plurality of memory locations via a serial communication device which is controlled by said microprocessor, such that data received at said receiver flows directly to at least one of said plurality of memory locations; and
   said microprocessor comprising logic circuitry, which generates and transmits control signals to said serial communication device and said storage medium.

2. The apparatus of claim 1, wherein said logic circuitry is a programmable array logic component.

3. The apparatus of claim 1, wherein said apparatus is connected to a video game player and a connection passes said computer data to said video game player.

4. The apparatus of claim 3, wherein said computer data is a video game.

5. The apparatus of claim 3, wherein said video game player has data, address and control busses and an bus interface between said apparatus and said video game player, said interface connecting said apparatus to said data, address and control busses of said video game player.

6. The apparatus of claim 5 wherein said video game player accesses said storage medium through said bus interface.

7. The apparatus of claim 6, wherein said at least one of said memory locations acts as a communication link between said apparatus and said video game player, and said video player has a player microprocessor, such that said player microprocessor notifies said apparatus microprocessor via said at least one of said plurality of memory locations when said computer data is received by said at least one of said plurality of memory locations.

8. The apparatus of claim 6, wherein a plurality of electronic gates provide a direct connection between said video game player data and address busses and said apparatus data and address busses to said storage medium, said apparatus microprocessor controls said plurality of electronic gates, such that said plurality of electronic gates enables and disables direct access to said storage medium by said player microprocessor over said video game player computer data, address, and control busses.

9. The apparatus of claim 1, wherein said microprocessor selects said computer data in accordance with a predetermined computer data identification scheme.

10. The apparatus of claim 9, wherein said scheme comprises inserting a first number code to identify a beginning of each block of said computer data and a second number code to identify a type for said preceding block of said computer data.

11. The apparatus of claim 1, wherein said storage medium comprises at least one temporary memory location for holding said computer data prior to transfer to said at least one of said plurality of memory locations and said serial communication device directs said computer data received at said receiver said temporary memory location.

12. The apparatus of claim 11, wherein said temporary memory location is a ready access memory.

13. A home subscriber data retrieval apparatus comprising:
   a data receiver for retrieving computer data from a public broadcasting medium;
   a storage medium having a plurality of memory locations; and
   a microprocessor for processing said computer data; said microprocessor controlling said data receiver, said microprocessor electing specific computer data to be received and rejecting other computer data received, said microprocessor controlling the flow of said specific computer data to said storage medium via data, address, and control busses, said microprocessor having access to said computer data over said busses;
   wherein a serial interface is created between said receiver and said plurality of memory locations via a special interface cable which receives control signals directly from said microprocessor, such that data received at said receiver flows directly to at least one of said plurality of memory locations; and
   said microprocessor comprising logic circuitry, which generates and transmits control signals to said storage medium via said special interface cable.

14. The apparatus of claim 13, wherein said control signals selected from the group consisting of a receive date only (RXDO) signal, a transmit date only (TXDO) signal, and a clear-to-send (CTSO) signal.

15. A home subscriber data retrieval apparatus comprising:
   a first microprocessor and a game cartridge connector;
   a data receiver for retrieving at least one operational element of computer data from a public broadcasting medium;

a storage medium having a plurality of memory locations; and a second microprocessor for processing said computer data; said microprocessor controlling said data receiver to select specific computer data and to reject other computer data, such that said microprocessor controls the transmission of said specific computer data from said receiver to said storage medium via apparatus data, address, and control busses, said second microprocessor having access to said computer data over said busses;

wherein a serial interface is created between said receiver and said plurality of memory locations via a serial communication device that is controlled by said second microprocessor, such that data received at said receiver flows directly to at least one of said plurality of memory locations; and said second microprocessor comprising logic circuitry, which generates and transmits control signals to said serial communication device and said storage medium;

wherein said connector controls the flow of data from said public broadcasting medium to said receiver and wherein said logic circuitry comprises protection circuitry and said protection circuitry is connected to said first microprocessor via said connector and said protection circuitry is adapted to receive bus control signals from said first microprocessor.

16. The apparatus of claim 15, wherein said logic circuitry is a programmable array logic component.

17. The apparatus of claim 15, wherein said connector provides a transmission path for address, data, and control signals generated by said first microprocessor to said logic circuitry.

18. The apparatus of claim 15, wherein said second microprocessor includes means for displaying run options and for selecting said at least one operational clement of computer data and means for maintaining a data connection between said receiver and said public data broadcasting medium and between said connector and said second microprocessor.

19. The apparatus of claim 18, wherein said means for displaying and selecting and said means for maintaining comprises computer software operably stored on said second microprocessor.

20. The apparatus of claim 19, wherein said means for displaying and selecting displays menus of video games, from which at least one video game may be selected, and provides options for running said selected video game.

21. The apparatus of claim 71, wherein said means for displaying and selecting is distinct from said means for maintaining.

22. A data transmitter apparatus comprising:

a data transmitter for transmitting computer data to a public broadcasting medium;

a segmented, ready storage device to hold selected computer data prior to transmission;

a microprocessor enabling said computer data in parallel form within a predetermined format to be transmitted to a serial communication device; and said serial communication device converts received computer data from parallel form to serial form within said predetermined format;

wherein said ready storage device is segmented into a random-access memory (RAM) portion and a read-only memory (ROM) portion.

23. The apparatus of claim 22, wherein said microprocessor controls the transmission of said computer data to said serial communication device from said ready storage medium via apparatus data, address, and control busses, said microprocessor having access to said computer data over said busses and said microprocessor comprising logic circuitry, which generates and transmits control signals to said serial communication device and said ready storage medium.

24. The apparatus of claim 22, wherein said microprocessor controls the transmission of said computer data to said ready storage medium from a static storage medium via apparatus data, address, and control busses.

25. The apparatus of claim 22, wherein said ready storage device comprises about one M byte of memory divided between said random-access memory (RAM) portion and said read-only memory (ROM) portion.

26. The apparatus of claim 25, wherein said ready storage device comprises eight equal memory banks.

27. The apparatus of claim 26, wherein each of said equal memory banks comprises 125 Kbytes of memory.

28. The apparatus of claim 26, wherein at least one of said memory banks is said read-only Memory (ROM) portion.

29. The apparatus of claim 26, wherein seven of said memory banks comprise said random-access memory portion.

30. The apparatus of claim 26, wherein said random-access memory (RAM) portion comprises means for processing said computer data prior to transmission, for interfacing with a plurality of serial channels, disc drives and data compression routines; and said read-only memory (ROM) portion comprises control tables, control information, and control pointers to data packets for transmission.

31. The apparatus of claim 22, wherein said serial communication device retrieves said computer data directly from said ready storage device.

* * * * *